(12) United States Patent
Von Platen et al.

(10) Patent No.: US 9,189,217 B2
(45) Date of Patent: Nov. 17, 2015

(54) METHOD FOR EXPLOITING MASSIVE PARALLELISM

(75) Inventors: Carl Von Platen, Malmö (SE); Johan Eker, Lund (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 87 days.

(21) Appl. No.: 14/348,983

(22) PCT Filed: Oct. 3, 2011

(86) PCT No.: PCT/EP2011/067232
§ 371 (c)(1),
(2), (4) Date: Apr. 1, 2014

(87) PCT Pub. No.: WO2013/050057
PCT Pub. Date: Apr. 11, 2013

(65) Prior Publication Data
US 2014/0237459 A1  Aug. 21, 2014

(51) Int. Cl.
*G06F 9/45* (2006.01)
*G06F 11/00* (2006.01)

(52) U.S. Cl.
CPC ............... *G06F 8/456* (2013.01); *G06F 8/452* (2013.01)

(58) Field of Classification Search
None
See application file for complete search history.

(56) References Cited

U.S. PATENT DOCUMENTS

| 4,445,903 A | * | 5/1984 | Minemura | D06P 3/8214 8/130.1 |
| 8,831,791 B2 | * | 9/2014 | Angell | G06F 1/206 700/300 |
| 2003/0033594 A1 | * | 2/2003 | Bowen | G06F 17/5045 717/141 |
| 2003/0097653 A1 | * | 5/2003 | Kim | G06F 8/452 717/160 |
| 2005/0015733 A1 | * | 1/2005 | Jones | G06F 17/5045 716/100 |

(Continued)

OTHER PUBLICATIONS

Von Platen, C., "Efficient Realization of a CAL Video Decoder on a Mobile Terminal (Position Paper)", IEEE Workshop on Signal Processing Systems, Oct. 8, 2008, pp. 176-181, IEEE, Washington, DC.

(Continued)

*Primary Examiner* — Isaac T Tecklu
*Assistant Examiner* — Mohammad Kabir
(74) *Attorney, Agent, or Firm* — Coats & Bennett, PLLC

(57) ABSTRACT

A method of statically testing dependence in a dataflow program is provided, the method comprising receiving a dataflow program which provides parameters, including consumption rates, production rates on connections between actors in the program and a number of initial samples (delays) on the connections, generating from the parameters a model of a precedence graph for the dataflow program representing dependence constraints between distinct firings of the number of actors. For the model, determining a feedback distance between multiple firings of a same actor, determining sets of parallel regions comprising a given number of actor firings of a same actor, composing mutually independent component regions comprising at least a part of the sets of parallel regions, and composing one or more composite regions comprising one or more component regions and/or one or more sets of parallel regions, being composed so that a pre-determined criteria is satisfied.

14 Claims, 14 Drawing Sheets

(56) References Cited

U.S. PATENT DOCUMENTS

| | | | | |
|---|---|---|---|---|
| 2005/0273305 | A1* | 12/2005 | Thalhammer-Reyero | G05B 17/02 703/11 |
| 2011/0145782 | A1* | 6/2011 | Brukner | G06F 8/74 717/104 |
| 2014/0089908 | A1* | 3/2014 | Dunn | G06F 8/443 717/151 |
| 2014/0281726 | A1* | 9/2014 | Garrett | G06F 8/443 714/37 |
| 2015/0128115 | A1* | 5/2015 | Chafi | G06F 8/443 717/148 |

OTHER PUBLICATIONS

Hsu, C., et al., "Cycle-Breaking Techniques for Scheduling Synchronous Dataflow Graphs", Technical Report #UMIACS-TR-2007-12, Feb. 1, 2007, pp. 1-14, Institute for Advanced Computer Studies, University of Maryland.

Liu, G., et al., "Static Scheduling of Synchronous Data Flow onto Multiprocessors for Embedded DSP Systems", 2011 Third International Conference on Measuring Technology and Mechatronics Automation (ICMTMA), Jan. 6, 2011, pp. 338-341, vol. 3, IEEE, Shanghai, CN.

Bhattacharyya, S., et al., "Scheduling Synchronous Dataflow Graphs for Efficient Looping", Journal of VLSI signal processing systems for signal, image and video technology, Dec. 1, 1993, vol. 6, issue 3, pp. 271-287, Kluwer Academic Publishers.

Hsu, C., et al., "Multithreaded Simulation for Synchronous Dataflow Graphs", ACM Transactions on Design Automation of Electronic Systems (TODAES), Jun. 1, 2011, pp. 25:3-25:23, vol. 16 Issue 3, Article 25, ACM, NY.

Zima, H., t al., "Supercompilers for Parallel and Vector Computers", Book, Standard Transformations, Jan. 1, 1991, pp. 180-186, 225-237,269-273, Frontier Series, ACM Press.

* cited by examiner

| Components are of.. | serial region | parallel region |
|---|---|---|
| ..same shape |  serial loop |  parallel loop |
| ..different shape |  sequence |  task graph |

METHOD FOR EXPLOITING MASSIVE PARALLELISM

TECHNICAL FIELD

The present invention relates to parallel computer systems, and especially to a computer-implemented method of identifying and extracting mutually independent computations in a dataflow program for exploiting massive parallelism.

BACKGROUND OF THE INVENTION

The interest in parallel computer systems has increased rapidly in recent years. Several physical problems, in particular that of power density, prevents further increase of clock frequency, which makes parallel execution the most viable path to further significant growth of performance.

Parallel computing using a multitude of processors executing in parallel is one solution attracting interest and research. The use of parallel computer systems is a particularly attractive solution if performance is put in relation to power consumption and related metrics, such as heat dissipation. However, it is hard to develop software that efficiently utilizes parallel computer systems; development cost and lead time present obstacles to progress in this direction.

Multiprocessing computer systems, including multiple-instruction stream multiple-data, MIMD, architectures utilizes several CPUs, which operate in parallel, such that computational tasks may be distributed over the CPUs. Computer clusters, multi-core or many-core processors and processors with support for hardware multi-threading, including hyper threading, are examples of multiprocessing computer systems or alternatively building blocks of such systems.

In contrast, a synchronous parallel computer, such as a single-instruction stream multiple-data, SIMD, architecture, may comprise a single CPU which decodes a single instruction stream and multiple processing elements each of which consists at least of an ALU and memory. In this case the parallelism is achieved by performing a single operation on multiple instances of data. Processor arrays, vector computers and parallel stream processors, including graphics processors, GPUs, are examples of this class of architectures. The border between the two classes of parallel architectures is not clear-cut: a GPU for instance may comprise several CPUs, which decode independent instruction streams and provide hardware support multi-threading, thus an MIMD architecture. Further, each CPU of the graphics processor may generally comprise multiple processing elements including a SIMD architecture.

However, developing software that efficiently utilizes parallel computer systems is costly and time consuming. One solution to this problem is to write programs that are independent of the target architecture at hand and transform the program into a form, which exposes parallelism in a manner that is appropriate for the particular target architecture. Such program transformation is known as parallelization in the context of MIMD architectures and vectorization in the context of SIMD architectures. Parallelization and vectorization have been studied extensively in the area of high-performance computing. A fundamental part of these tasks have typically included dependence analysis, a task whose complexity depends on the programming language being analyzed. In particular, it is well-known that programming languages with pointers, such as the C programming language, make the analysis of data dependence a very complicated matter. Analysis of the dependence caused by array references may also be complex and may generally be solved by heuristic methods and approximation.

As computer software traditionally has been written for serial computation, sequential computer programs are not laid out for easy parallelization. Thus, dataflow programming is investigated to specify massively parallel algorithms, and though the dataflow programs are easier to parallelize, they still need to be mapped onto the different processing units of the system. The mapping may be done statically at compile time or dynamically at run-time. Static scheduling, of the entire program or part thereof, is beneficial in certain situations and in particular, the run-time overhead, which is typically associated with dynamic scheduling, may be avoided.

However, mapping a dataflow program onto a number of processors, each performing a specific subtask, is not straight forward as for example synchronization between the different subtasks must be achieved. Furthermore, typically, a program may comprise parts that are parallelizable as well as parts that are non-parallelizable, i.e. sequential.

It has been suggested to perform parallelization by finding looped schedules in synchronous dataflow programs. A looped schedule may be seen as a serialization of the actor firings in the form of a loop nest, which means that traditional parallelization techniques are applicable, see for example S. S. Bhattacharyya and E. A. Lee, "Scheduling Synchronous Dataflow Graphs for Efficient Looping", J. VLSI Signal Processing, 6, pp. 271-288, Kluwer Academic Publishers, 1993. However, there are generally a large number of options for both the loop nest and the serialization of the actor firings and the choices made affects the properties of the resulting parallel program, such as the CPU utilization, latency, synchronization overhead, storage requirements etc. Furthermore, the formation of a looped schedule makes premature decisions, which may likely lead to suboptimal solutions.

SUMMARY OF THE INVENTION

It is an object of the present invention to overcome at least some of the disadvantages of the prior art as mentioned above, and particularly to provide a method of identifying and extracting mutually independent computations in a dataflow program for exploiting massive parallelism.

According to the present invention, a method of configuring a multitude of data processors to perform a process, is provided, the method comprising identifying and extracting mutually independent computations in a dataflow program for exploiting massive parallelism is provided. Also, a computer-implemented method of identifying and extracting mutually independent computations in a dataflow program for exploiting massive parallelism is provided.

The method may comprise receiving a dataflow program having a number of actors and a multiplicity of connections connecting the actors, wherein the dataflow program specifies dataflow program parameters. The dataflow program may thus provide specified consumption rates and specified production rates on the multiplicity of connections. The dataflow program may further provide a specified number of initial samples (delays) on at least a part of the multiplicity of connections. The initial samples may provide input for a first set of actors. The method may further comprise generating from the dataflow program parameters, which may include the specified consumption rates, the specified production rates, and the specified number of initial samples, at least one model of a precedence graph for the dataflow program representing dependence constraints between distinct firings of the number of actors.

The precedence graph model may have a number of vertices, having associated therewith an actor-index pair, and edges representing precedent constraints. For the at least one model of the precedence graph a feedback distance between multiple firings of a same actor in the model of the data dependence graph may be determined. Furthermore, sets of parallel regions for at least a part of the number of vertices of the model of the precedence graph may be determined, such that each set of parallel regions comprises a given number of actor firings of a same actor, the given number being dependant on the determined feedback distance.

Mutually independent component regions may be composed so that each component region comprises at least a part of one or more sets of parallel regions and one or more composite regions may be composed comprising one or more component regions and/or one or more sets of parallel regions wherein the composite regions may be composed so as to satisfy a pre-determined criteria. Hereafter, the composite regions from the model of the precedence graph may be extracted.

Preferably, the data dependence graph representing the dataflow program is schedulable.

In one embodiment, the identified and extracted mutually independent computations in the dataflow program may be scheduled onto the multitude of data processors.

In a further aspect of the present invention, a computer program is provided, the computer program comprising program code means for performing the method(s) and/or processes as set out in this description when said computer program is run on a computer.

In a still further aspect of the present invention, a computer readable medium is provided, the computer readable medium having stored thereon program code means for performing the method(s) and or processes as set out in this description, when said program code means is run on a computer.

In another aspect of the present invention an apparatus for identifying and extracting mutually independent computations in a dataflow program according to the method as provided herein. The apparatus comprising receiving means for receiving the dataflow program and storage means for storing the at least one model of the precedence graph. The apparatus may further comprise processing means configured to determine a feedback distance between multiple firings of a single actor in the model of the data dependence graph. The same or another processor may furthermore be configured to analyze the precedence graph to determine the sets of parallel regions for at least a part of the number of vertices of the model of the precedence graph, compose the mutually independent component regions, and compose the one or more composite regions. The apparatus may furthermore comprise controlling means to control the composition of the composite regions so as to ensure that the composite regions are being composed so as to satisfy a pre-determined criteria. Also extracting means, such as an interface, may be provided for extracting composite regions from the model of the precedence graph.

It is envisaged that throughout the description and the claims the term processor or processing unit is means to comprise any processing means, such as processing means including but not limited to a node, i.e. a computer, of a computer cluster, a processor of a multi-processor system, a processor core of a multi-core or many-core system, a hardware thread of a processor with support for hardware multithreading, a processing element of a vector processor, an ALU of an ALU array.

A data flow program typically has of a number of computational kernels, called actors, and connections that specify the flow of data between the actors. Further, each actor typically has a set of ports, which serves as endpoints of the connections: an actor reads input from its input ports and produces output to the output ports. An important property of a dataflow program is that the actors only interact by the flow of data over the connections.

The dataflow program may comprise multiple stages of sample-rate conversion, or a Fast Fourier Transform element, such as a radix-4 FFT element or a 4096-point FFT element, such as for example in digital signal processing.

In one embodiment, hardware synthesis from a dataflow program is considered and particularly, the present invention may comprise implementing the method in hardware synthesis. In particular application specific integrated circuits ASICs and reconfigurable hardware, such as FPGAs may be used for hardware synthesis. The present invention may allow for generation of a multitude of implementations, in which trade-offs between area and throughput are made differently. A serial section may correspond to resource sharing, being economic but allowing for a low throughput, whereas a parallel section may correspond to resource duplication, being large in terms of area but providing a high throughput.

In other applications, each instance of a parallel region may be mapped dynamically onto different processing units of a hardware platform.

An actor executes in steps called firings; it can execute (fire) when a sufficient amount of input has been provided.

Thus, each firing of an actor may comprise 1) reading input from the input ports, 2) performing computations, 3) writing output to the output ports and 4) updating the state of the actor.

At least conceptually, each actor firing may be viewed as an atomic step. Furthermore, inputs may be read and outputs may be produced serially onto the connections so that a consumer receives inputs in the same order as produced.

The structure of a dataflow program may be described by a dataflow graph in which each vertex corresponds to an actor and each directed edge corresponds to a connection between two actors.

In a dataflow program, the control flow may not be specified so that the relative order in which the actors fire may be constrained only by the presence of input, and generally, there are many valid execution orders.

To parallelize a dataflow program, the computations of the program may be mapped onto CPU's, such as cores or processing elements, of the system and the computations may be ordered serially in order to execute on each sequential CPU. This process is known as scheduling, and both subtasks, mapping and ordering may be performed statically, such as at compile time, or dynamically, such as at run-time.

Synchronous dataflow programs may be scheduled statically: an execution order may be determined ahead of time such that the availability of input may be guaranteed. It is an advantage of scheduling the dataflow programs statically that the run time overhead may be reduced. It is an advantage, that given a static schedule, it may be possible to synthesize a sequential program, including loops, from a dataflow program.

In one embodiment of the present invention, the dataflow program is a synchronous dataflow program (SDF). An SDF is a restricted form of dataflow, which may be scheduled statically. Each firing of a given actor in an SDF program consumes and produces the same amount of data at all times so that the consumption and production rates are fixed. This property of an SDF program makes it advantageous to construct a periodic schedule for an SDF program.

The fixed rates may make it possible to construct a periodic schedule for an SDF program. The first step towards finding such a schedule will be to determine the number of times each actor fires in a (minimal) periodic schedule. The number of firings may be given by the repetitions vector, which is the least positive integer solution to the balance equations, see below. A periodic schedule thus gets the property of balanced production and consumption on each connection, which means that it may be repeated indefinitely but still use bounded buffers for the connections.

Typically, when scheduling a dataflow program, a repetitions vector may be derived. The repetitions vector may specify the number of times each actor fires in a (minimal) periodic schedule. The repetitions vector may be found as the solution to the so-called balance equations and the dataflow graph is said to be consistent if there is a solution. The repetition vector may thus provide the length of a minimal period or a minimal periodic schedule, which minimal period may be used as a termination condition when traversing a dependence path. Thus, a termination condition for analyzing the model of the precedence graph may be established using repetitions vector(s) of the dataflow program.

It is envisaged that also other ways of providing a minimal period or a minimal periodic schedule may be applied. The minimal period may be a period in which there is no cyclic dependence.

The feedback distance may furthermore be determined from the model of the precedence graph. A feedback distance, or a minimal dependence distance, may be obtained in that when starting from an initial vertex signified by a first actor and a first index, a minimum index vertex signified by the first actor having a minimum index and being transitively dependent on the initial vertex may be determined. The feedback distance may be provided as the difference between the minimum index and the first index.

Thus, preferably, the vertices of the model are ordered according to the precedence constraints so that all, or substantially all, vertices have a set of successor/predecessor vertices. At least a part of the model of the precedence graph may be analyzed by performing an iterative process. The process may comprise selecting a minimum/maximum index vertex from a set of successor/predecessor vertices, such that the minimum/maximum index vertex depends on a given predecessor/successor vertex while considering only the dependence caused by the production rate and the consumption rate on the edge between the predecessor/successor and the set of successor/predecessor vertices. Preferably, the iterative process is initiated with an initial vertex selected among the first set of actors of the precedence graph model, and comprises determining for each selected minimum/maximum index vertex if the selected minimum/maximum index vertex is dependent on itself to thereby establish whether a cyclic dependence is present. It is envisaged that the dataflow graph may be decomposed into simple cycles and each cycle is checked separately.

Typically, the analyzing process will be terminated when complete period has been analyzed. The analyzing process may also be terminated if a cyclic dependence is found. The step of analyzing may further comprise a termination requirement, so that the iterative process is terminated after the termination criteria is met. The iteration may be terminated after a preset time, after having analyzed a predetermined number of vertices, after it has been determined for a specified number of selected minimum/maximum index vertices whether the selected minimum/maximum index vertex is dependent on itself, or the iteration may be terminated when a complete period has been analyzed. A termination condition for analyzing the model of the precedence graph may furthermore be established using repetitions vector(s) of the dataflow program.

The feedback distance may then be obtained in that when starting from an initial vertex signified by a first actor and a first index, a minimum index vertex signified by the first actor having a minimum index and being transitively dependent on the initial vertex may be determined. The feedback distance may then be provided as the difference between the minimum index and the first index.

There are generally many valid static schedules for a dataflow program, all of which are summarized by the precedence graph. Any topological ordering of the precedence graph may correspond to a valid schedule. Usually an ordering is selected such that some optimization criterion is met, such as minimization of the storage required for the buffers.

Typically, any topological order of a precedence graph may correspond to a valid schedule. It may be advantageous to consider multiple periods of a minimal periodic schedule to obtain an efficient schedule. Generally, there is a very large number of options for generating the schedules, each of which has distinct properties, such as storage requirements, code size throughput and latency. The selection of one preferred schedule typically involves a trade-off between such properties.

The size of the precedence graph may not depend only on the size of the dataflow program but also on relations between the production rate and the consumption rate, i.e. on the precedence constraints. Thus, programs exposing massive parallelism typically have very large precedence graphs. It is an advantage of the present invention that enumeration of all vertices and edges in the precedence graph is avoided. It is a further advantage that a limited number of paths in the precedence graph are selected such that they jointly bear witness of the absence of cycles. By using the model of the precedence graph an arbitrary number of periods may be considered while causing limited or no additional work.

For a given dataflow program represented by a corresponding dataflow graph where actors are connected by a multiplicity of connections. The specified consumption rates and specified production rates on the multiplicity of connections and a specified number of initial samples (delays) on at least a part of the multiplicity of connections is specified by the dataflow program and provided in the dataflow graph. The initial samples, or delays, may provide input for a first set of actors, and may be any number N, such as 64, 160, such as 4096, etc. Initial samples are typically required to make a cycle in a synchronous dataflow graph realizable.

A dataflow graph may have a number of actors, such as A, B, C, D, E, F, such that B depends on A, C depends on B, etc. and A depends on F. In this case, A is the predecessor for B, while A is the successor for B, etc. For example, a first firing of B, the successor, such that it depends on a given firing of A, the predecessor, while considering only the dependence caused by production rate and consumption rate of samples on the connection (A, B), that is the connection between predecessor and successor, may be found. The first firing, i.e. the "first child", in this context is the firing of B as dependent on A with the minimum index, thus the minimum-index firing of the successor as dependent on the predecessor. To generalize, the first firing of any actor in a given path from A, such that they depend on A, e.g. the path ABCDEFA may be found.

The edges may also be traversed in the opposite direction so that the path to the last parent, i.e. the actor with the maximum index in each step. Thus, for example, if starting from the actor A and moving "upwards" in the precedence graph, A will be the predecessor for F, and F will be the successor for the A, F will be the predecessor for E, etc. In this case, the first firing of F that depends on A, is the firing of F having a maximum index, i.e. the "last parent", thus the maximum-index firing of the predecessor as dependent on the successor.

The selection of the minimum-index firing, as well as the selection of the maximum-index firing may be expressed as a monotonic non-decreasing function.

For example, by considering all paths in the dataflow graph that start at A, the first firing of any actor, which is reachable from A such that it depends on a given firing of A may be found. Typically, it is sufficient to consider only simple paths, i.e. paths in which each vertex (actor) appears at most once, with the exception of the first and last vertex of the path, which may be identical (thus creating a simple cycle). The dataflow graph of the example has only a single simple path between any pair of actors and ABCDEFA is the only simple cycle from A to A.

It is an advantage of the present invention that the decision of loop nest and serialization of actor firings is deferred, such that the task of finding mutually independent sets of computations which may be executed in parallel may be considered when making those decisions. This invention thus proposes a representation of the precedence graph, which allows for the formation of looped schedules, but which generally allows for a flexible choice of loop nests and serialization of actor firings.

It is a further advantage of the present invention that massive parallelism may be exploited in that all vertices and edges of the precedence graph may not need to be explicitly enumerated when determining a schedule. Hereby also large repetitions vectors and multiple periods may be managed efficiently.

In the present invention, sets of independent actor firings may be identified and a data parallel schedule whose building blocks generally comprises several actor firings may be determined.

In this respect it may be advantageous to look at tiles or regions of actor firings.

A tile or a region may be a mapping, from an integer, n, to a set of actor firings and, in its simplest form, a tile may represent a single actor firing, $\{A_n\}$. Larger tiles may be composed by either considering additional instances of the same tile, for instance $\{A_{100n}, A_{100n+1}, \ldots, A_{100n+99}\}$ or by forming the union of different tiles, for instance $\{A_n, B_{n+1}\}$. Hereby sets of parallel regions for at least a part of the number of vertices of the model of the precedence graph may be determined, such that each set of parallel regions comprises a given number of actor firings of a same actor, the given number being dependant on the determined feedback distance. Component tiles or component regions may be composed so that each component region comprises at least a part of one or more sets of parallel regions. It is envisages that a set may include zero, one or more elements, so that a set of actor firings may comprise zero, one or more actor firings, thus the set of actor firings may be an empty set. Also, a set of parallel regions may comprise zero, one or more parallel regions, etc. Also, a parallel region in its simplest form may comprise one actor firing. The next level larger tile or region, the composite region, is then composed of component tiles or regions, or sets of parallel regions. Each tile may represent the total set of actor firings in either a serial or a parallel region.

Thus, mutually independent component regions may be composed so that each component region comprises at least a part of one or more sets of parallel regions and one or more composite regions may be composed comprising one or more component regions and/or one or more sets of parallel regions. The composite regions may be composed so as to satisfy a pre-determined criteria. The composite regions from the model of the precedence graph may be extracted for scheduling of the dataflow program.

It may be useful to think of a tile in terms of the sub graph (of the precedence graph), which it induces. Some tiles may induce sub graphs of "the same shape" (isomorphic sub graphs) when applied to a sequence, n=0, 1, 2, ..., of integers. A schedule loop may be created by instantiating such tiles several times.

Another particularly interesting class of tiles are those that induce a sequence of sub graphs, between which there is no path in the precedence graph. The instances of such a tile represent mutually independent computations, which may be executed in parallel. When a tile or region contains firings of an actor that is part of a cycle in the dataflow graph there is a limit as to how many instances may be composed without rendering the computations dependent. This may be referred to as the maximum parallelism of the tile.

Two properties in combination may signify a tile that exposes data parallelism: the tile generates computations of "the same shape" and (possibly by limiting the number of tile instances) the computations are mutually independent.

To find a periodic schedule a fixed number, say N, periods of the precedence graph may be "covered" with tiles such that the condensation of the precedence graph is acyclic. In this way, a single top-level tile is composed such that:
a) it represents all the computations (actor firings) of N periods and
b) the component tiles may be ordered such that the precedence constraints are satisfied.

Similarly to the terminology used in the context of vectorization and parallelization of sequential programs, a portion of the schedule may be referred to as a region. A tile specifies the actor firings, which belong to the region, and a distinction may be made between serial regions, whose components execute sequentially, and those representing parallel regions, whose components may be executed in parallel.

A further distinction may be made depending on the method in which the tile of the region was composed. If a tile or region is composed using several instances of the same tile, it represents a serial or a parallel loop. A composite tile, which signifies a parallel loop have component tiles that are mutually independent. The components of a serial region are ordered sequentially; in this case dependence between the components may be allowed, but there should not be any cyclic dependence.

For example, if the tile is composed using distinct tiles, it represents a sequence of regions or a task graph of regions when the resulting, composite, tile signifies a serial and a parallel region, respectively. There are basically four cases, depending on the kind of region, i.e. either serial or parallel, and the kind of composition, i.e. several instances of the same tile or several instances of different tiles.

Except for the case of serial regions that are aggregated into a larger serial region, synchronization may be required between a pair of dependent regions: the second region in such a pair should not start executing before the first region has been completed, that is the precedence constraints must be maintained. The task of enumerating all possible tiles, even for a given number of periods, N may be a complex combinatorial exercise. It is an advantage of the present invention that the equivalent of classic vectorization and parallelization techniques (of sequential programs) using tiles of very specific forms may be formed so that the verification of the mutual independence of arbitrary tiles may not be not required. This is advantageous as the verification could essentially amount to the same problem as testing independence of array references in sequential programs which is typically solved by approximate tests due to the complexity of the problem.

An actor firing, $A_n$, may be a pair of an actor (a vertex of the dataflow graph), A, and an integer index, n, the convention that the firing with index zero is the first firing of an actor is used (index one denotes the second firing and so on).

A tile may be a function from an integer, n, to set of actor firings, in which the index of each firing in the set is given as a linear expression in n. The set of actor firings that results when applying the function to a particular integer, n, is called an instance of the tile.

The composition of tiles may start at singleton tiles, such as $\{A_n\}$, consisting of a single firing of some actor, A, with index n. Larger tiles may be created by either forming the union of k instances of the same tile or by forming the union of two non-overlapping (disjunct) instances. In the first case a tile f is the composition of k instances of a tile g, $$f(n) = \bigcup_{0 \le j < k} g(kn + j).$$

The tile f is called the composite tile with respect to g and g is called the component tile with respect to f. In the second case f is the composition of $g_1$ and $g_2$; $g_1(n) \cap g_2(n) = \emptyset$, $$f(n) = g_1(n) \cup g_2(n),$$

which may be generalized to the union of k mutually disjunct tiles:

$$f(n) = g_1(n) \cup \ldots \cup g_k(n).$$

Also in this case f may be referred to as composite tiles (with respect to $g_1, \ldots, g_k$) and $g_1, \ldots, g_k$ may be referred to as the component tiles with respect to f.

An additional transformation of tiles may be used, but this need not be a composition (the number of actor firings remains the same). The transformation may comprises addition of a constant offset, d, to the argument of a tile:

$$f(n) = g(n+d).$$

The offset, d, is used to model connections with initial samples, to compose structures that we call edge tiles and to create a retimed schedule of a dataflow graph.

Tiles may thus specify a partitioning of the actor firings (the computations) of a dataflow program. In some embodiments, when additionally considering the ordering of the firings, the tiles may be referred to as regions (c.f. the same concept for sequential programs). A distinction may be made between a serial region, in which the component tiles are ordered and executed sequentially, and a parallel region, in which mutually independent component tiles are allowed to execute in parallel.

A first kind of composition such as that of k instances of a single tile may correspond to the control-flow structure of a loop. If the component tiles are mutually independent, it may be possible to create a parallel loop (a parallel region) in this way. In such a loop, the iterations may execute in parallel. It may also be possible to create a serial loop (serial region), in which case the component tiles are not required to be mutually independent.

The composition of several, distinct tiles into a serial region may be said to correspond to the control-flow structure of a sequence. The component tiles may be ordered and a synchronization primitive (e.g. barrier) may be required at the boundary of regions, except in the case of two adjacent serial regions. The ordering of component tiles may affect the amount of synchronization necessary and the use of the composite tile (the serial region) as a component of larger tiles (regions) may be useful to determine whether or not barriers are needed at the beginning and the end of the serial region.

The composition of distinct tiles into a parallel region corresponds to dynamic parallel schedule, sometimes called a task graph or, in the context of UML, an activity diagram. This is the source of task parallelism in the proposed technique. In this case the component tiles may be merely partially ordered and synchronization may be generally required between each pair of dependent tiles.

Of these four kinds of regions, the most specific requirements may be put on the parallel loop. On the other hand a parallel loop may be realized using any of the other three control structures: it may be executed as a serial loop and it may be unfolded into a task graph. A serial loop may, similarly, be unfolded into a sequence and a task graph may be scheduled sequentially, which also results in a sequence. It may thus be possible to transform a region from parallel to serial and from loop to a single region, in which the "identical shape" of the computations is disregarded; however, it is not possible in general to go in the opposite directions.

Cycles in the dataflow graph may complicate the task of vectorization and parallelization, since cycles make firings of a single actor (say $A_n$ and $A_{n+d}$) transitively dependent, i.e. transitive dependence corresponds to paths in the precedence graph, whereas "plain" dependence correspond to single edges. The minimal dependence distance, d, such that $A_{n+d}$ depends transitively on $A_n$, limits the number of instances of the tile $\{A_n\}$ which may be composed into a parallel region: $\{A_n, \ldots, A_{n+d-1}\}$ are mutually independent firings of A, but it is not possible to include $A_{n+d}$ in this set.

It is sufficient to consider transitive dependence along simple paths in the dataflow graph: paths in which each vertex (actor) appears at most once, except for the first and last vertex that may be identical, thus creating a simple cycle. Under the assumption that the dataflow graph is live, any reappearing actor would only result in a longer dependence distance, d, and for the present embodiment, only the minimal d is important.

In some situations, however, it may be beneficial to work with smaller tiles, and it may be possible to determine a smallest set of firings, which is required to make an vertex; by following the dependence edges in reverse orientation from said vertex, a minimum set of parallel actor firings may be found, i.e. minimum in order to make progress along the cycle in the dataflow graph.

In this way, it may be possible to find a collection of smaller tiles, each of which has the property of making progress along the cycle. In general, a dataflow graph may contain several cycles and also actors, which are not involved in any cycle. The latter case is simple; they cannot cause cyclic dependences and need not be considered. To deal with multiple cycles, the dataflow graph may be decomposed into its strongly connected components.

An interesting property may be found in that the more parallelism that is exposed by the dataflow graph, the fewer the paths may need to be explored in the precedence graph. The minimal number of firings of a single actor in a periodic schedule (of a particular cycle in the dataflow graph) may bound the number of periods that need to be explored.

The components, which may consist of several (cyclically connected) actors, may be said to be non-trivial and they may be further decomposed into sets of simple cycles. This may be achieved by removing a set feedback edges such that an acyclic directed graph (DAG) results. Simple cycles may result by reinserting the feedback edges. The selection of feedback edges, which are removed to make each component acyclic, may not be critical. It may however be possible to only select feedback edges that correspond to connections with sufficient initial samples for the first firing of the consumer (otherwise there is a cycle with insufficient initial samples and the dataflow graph would be not live). In this way, the sources of the DAG correspond to actors that can fire initially (using initial samples only).

Each simple cycle may have a period that may be significantly shorter than that of the schedule for the entire dataflow graph. This situation may arise when the number of firings of each actor (as specified by the repetitions vector) within the simple cycle have a common divisor that is greater than one. The proposed schedulability or dependence test benefits here from: less firings in a period means that it might suffice to explore a lower number of paths to verify the absence of cyclic dependences.

After this decomposition, the schedulability or dependence of each resulting cycle may be verified separately. Enumerating all simple cycles, however, may potentially lead to an impractical model, since the number of cycles may be exponential in the number of vertices (actors). Instead, all cycles that share a feedback edge may be traversed simultaneously by visiting the vertices of the DAG in reverse post order and summarizing multiple paths at vertices with multiple predecessors.

A composition of a tile having mutually independent components may allow for parallel execution. The synchronization overhead may be reduced by using large tiles, it may be said that composition corresponds to fusion of parallel regions. In the previous section it was seen that cycles in the dataflow graph may limit the number of firings of a single actor that are mutually independent. Another option may be to compose firings of different actors that are mutually independent.

In identifying mutually independent firings, we leverage on a specific form of tile, which we call an edge tile. An edge tile has the property of representing the precedence constraints that correspond to a single edge in the dataflow graph. An edge tile may result in a recurring, periodic, dependence pattern: the sub graphs of the precedence graph, which are induced by several instances of an edge tile, have the "same shape" and an integral number of instances cover one period of the schedule.

The structure of an edge tile may be completely determined by the properties of the connection, to which the edge corresponds: the production rate, the consumption rate and the number of initial samples ("delays").

The firings within a single instance of an edge tile are generally always dependent and thus may form either a serial region or a task graph that requires synchronization. Under certain conditions, however, multiple instances of an edge tile may execute in parallel. If the number of initial delays is a multiple of the greatest common divisor of the production and consumption rate, it may be possible to align the firings of the two actors such that the instances of the edge tile are mutually independent, although still subject to transitive dependence along cycles. For such edge tiles, the connection between the actors is drained before and after executing the set of firings of the edge tile.

If the number of initial samples is not divided by the greatest common divisor of the rates, an edge between the induced sub graphs may be unavoidable. Such an edge indicates that the tiles represent dependent computations which typically must execute serially and the dependence is due to remaining samples on the connection, i.e. it is not possible to drain the connection.

The edge tiles, which represent precedence over single edges in the dataflow graph, may be composed into tiles representing simple paths. The choice of component edge tiles greatly affects the properties of the composed tile. Also in this case, it may or may not be possible to align edge tiles such that the instances of the composed tile are mutually independent. In general, there is a trade-off between the synchronization overhead and the parallelism that is exposed by different compositions of edge tiles.

In an exemplary application of the method according to the present invention, a dataflow program may be received. The first step may be to verify the existence of a periodic schedule. It may be sufficient to find a repetitions vector that results in balanced production and consumption on each connection and to verify that the dataflow graph is live. As described above, different techniques may be applied for establishing that the dataflow graph is live and for finding a feedback distance.

A second step may include to decompose the dataflow graph into strongly-connected components and to schedule each strongly-connected component separately; thus creating a partial schedule. The precedence graph may have a periodic dependence pattern, corresponding to the period of a minimal periodic schedule. This means that also the sub graph induced by a strongly connected component has a periodically recurring dependence pattern (the same "shape" repeats itself) with at most the same period. However, the strongly connected component may also have a shorter period, such that the "shape" repeats an integral number of times within a minimal periodic schedule of the entire dataflow graph. It suffices to find a schedule of one such period (a partial schedule), which may then be repeated multiple times. If there are sufficient initial samples on the connections, it may be possible to find partial schedules that span several periods of the strongly connected component. Such schedules may be determined in addition to the minimal one, which corresponds to a single period.

A third step may be to combine the partial schedules of each strongly connected component. This task may operate on the acyclic condensation of the dataflow graph. Each strongly connected component may then essentially be treated as a single actor with consumption and production rates rescaled such that they correspond to one period of the partial schedule that was determined in the second step. Further, instead of contributing with a single actor firing, the "firing" of each strongly connected component corresponds to one period of the partial schedule. Since there can be no cyclic dependence between the vertices of the acyclic condensation, it may be possible to increase the blocking factor (vectorize) each vertex arbitrary, although the resulting latency of computations and the memory required for buffers may put practical limits on the degree of vectorization. Further, throughput is still limited by vertices that are non-trivial strongly connected components, with internal cyclic dependence, which means that the benefit is likely to diminish.

The second step, the scheduling of a strongly-connected component, may be further detailed. For trivial components which may consist of a single actor, there are principally two cases depending on whether the actor is involved in a self-loop or whether it is not part of any cycle. In the former case, the number of initial samples on the self-loop may limit the number of instances that are mutually independent and that thus may execute in parallel; in the latter case, any number of firings of the actor may form a parallel region; For non-trivial strongly-connected components, two options of forming parallel regions will be further developed: parallel regions consisting of multiple firings of the same actor and parallel regions consisting of firings of multiple actors.

A set of feedback edges, may be removed from a strongly connected component, thereby rendering into a form, where it may be represented by a directed acyclic graph. The minimal dependence distance or the feedback distance of each actor along the cycles via the feedback edges may then be determined. The sub graph of the precedence graph, which may be induced by the firings of the actors in the strongly connected component may in this way be "sliced" into smaller sub graphs such that the firings of a particular actor in the slice are mutually independent and thus may execute in parallel. Firings of different actors in a first slice might be (transitively) dependent and each actor in the first slice may have to fire one or several times to satisfy the precedence constraints of the firings in the following slice. The precedence constraints between the actors may be given by the directed acyclic graph and the slices may be ordered linearly.

One option for a schedule of a strongly connected component may be to form parallel regions of the mutually independent firings of each actor within a "slice" and concatenate the slices into a serial region, in which the parallel regions are ordered according to the precedence constraints within the "slice" (a topological ordering of the actors in the directed acyclic graph). In this way, we get a partial schedule, which corresponds to each slice. By aggregating these partial schedules into a larger serial region, a partial schedule of the strongly connected component may result.

Another option may be to identify mutually independent actor firings using tiles representing edges and paths. In this case, tiles may be formed not only by aggregating multiple firings of a single actor, but also firings of different actors. Tiles may be formed by considering pairs of connected actors (for which there is an edge tile); pairs of actors, for which a large number of mutually independent instances may be created, may preferably be used to compose parallel regions and one or more of the following constraints may apply:

- A first constraint may be that the composed tile may be contained entirely within one "slice" of the precedence graph, by which cyclic dependence is avoided.
  - A second constraint may concern the size of the composed tile in relation to the number of firings in the "slice".
  - A third constraint may be that the tile may be "aligned" such that instances of the tile may be mutually independent (unless the tile can be aligned, two adjacent instances are mutually dependent).

In one embodiment of the invention, the tiles may be composed by repeatedly selecting the edge tile that results in the highest number of mutually independent instances. When all edges have been considered, a condensed precedence graph may result. It is sorted topologically to yield the partial schedule of a "slice". By avoiding any composition that results in less than a prescribed number, N, of mutually independent tiles, excessive composition is avoided.

In the present context, an edge in the precedence graph may be a pair of actor firings (A, B). The set of all edges may be known as the dependence relation.

The presence of an edge, $(A_j, B_k)$, means that $B_k$ depends on $A_j$ or, stated differently, $B_k$ consumes a sample that is produced by $A_j$. Thus, $A_j$ is the predecessor for $B_k$ while $B_k$ is the successor for $A_j$.

The dataflow graph may have a number of actors having specified consumption rates and specified production rates and a multiplicity of edges connecting the actors. Thus, for a given dataflow graph, the task may be to find the first firing of an actor B such that it depends on a given firing of an actor A, say $A_0$, while considering only the dependence caused by production and consumption of samples on the edge or connection (A, B).

The dependence relation may be formed as the union of a collection of simpler relations, each of which models dependence with respect to a particular edge, e, in the dataflow graph. It turns out that $B_k$ consumes at least one sample, which is produced by $A_j$ on the connection e=(A, B), precisely when the number of initial samples $$0 < D_e + (j+1)P_e - kC_e < P_e + C_e,$$

where $P_e$ is the production rate on e, $C_e$ is the consumption rate and $D_e$ is the number of initial samples.

Thus, the balance on a connection between a first producing actor having a first production rate and a first consuming actor having a first consumption rate, may be provided as the sum of the number of initial samples and the cumulative first production rate subtracted the cumulative consumption rate, given a first number of firings of the first producing actor and a second number of firings of the first consuming actor. The cumulative first production rate may be the first production rate times the first number of firings, and the cumulative first consumption rate may be the first consumption rate times the second number of firings.

The following two equivalent ways of expressing the same thing:

$$\left\lfloor \frac{D_e + jP_e}{C_e} \right\rfloor \le k \le \left\lceil \frac{D_e + (j+1)P_e}{C_e} \right\rceil - 1,$$

$$\left\lfloor \frac{kC_e - D_e}{P_e} \right\rfloor \le j \le \left\lceil \frac{(k+1)C_e - D_e}{P_e} \right\rceil - 1,$$

From these equations, the means of identifying the "first child", the first successor, and the "last parent", the first predecessor, may be given. The lower bound on k, given j, may be the "first child" and the upper bound of j, given k, may be the "last parent".

Typically j and k may be allowed to take on any integer value, including negative values, since special exceptions at the boundary between periods may hereby be avoided. Like in the examples, the convention that index zero signifies the first firing is used. Dependence on a firing with negative index (negative j) indicates dependence on initial samples (assuming that k is nonnegative).

As a consequence, the dependence relation, and thus also the precedence graph, may be said to not only extend indefinitely into the future but also into the indefinite past. It is an advantage of the present invention that by using the model as described above an indefinite number of periods of the precedence graph may be modeled, and not just a fixed number of periods, such as one, as typically provided for in the prior art. It is a further advantage of the present invention that also edges that span the boundary of first and last periods are present in the model.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

DETAILED DESCRIPTION OF THE DRAWINGS

Figure 1A:
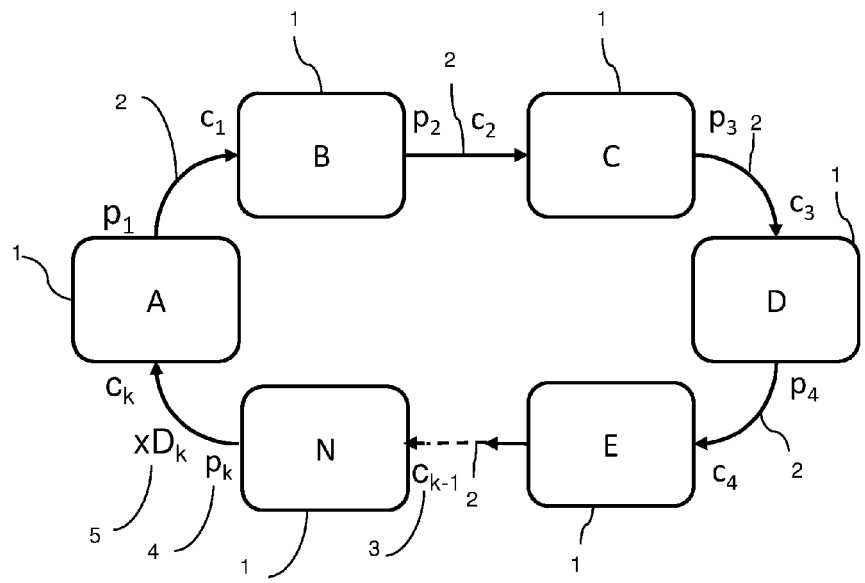
FIG. 1a shows a generalized dataflow graph.

In FIG. 1a, a dataflow graph is shown wherein the vertices 1 represent actors A to N connected in a cycle, where N is an integer number, and wherein the actors 1 are connected via connections 1 to k, 2. The dataflow graph is a graph representation of a dataflow program. Each actor has an edge label specifying the production and consumption rate of the connection. For example, for the actor N, the consumption rate 3 is labeled $C_{k-1}$ and the production rate 4 is labeled $P_k$, so that the actor N has a production rate of $P_k$ and a consumption rate of $C_k$. A connection 2 between two actors 1, such as between actor A and actor B, is referred to as the connection (A, B).

One of the connections, the connection (N, A), has an integer number x of initial samples or delays, which is specified by the label 5 "$xD_k$". Thus, the connection (N, A) is characterized by the production rate $P_k$, the consumption rate $C_k$, and the number of initial samples $xD_k$.

In FIG. 1a, an exemplary dataflow graph is shown having actors A through F 1 connected in a cycle via connections 2, and an initial sample on the connection (A, F) being 4, which is specified by the label 4D. In the present example, the actor A has a consumption rate of 2 and a production rate of 3, the actor B has a consumption rate of 1, and a production rate of 1, the actor C has a consumption rate of 2 and a production rate of 4, the actor D has a consumption rate of 1 and a production rate of 2, the actor E has a consumption rate of 3 and a production rate of 1, and the actor F has a consumption rate of 2 and a production rate of 1. There are 4 initial samples on the connection (F, A).

For example in a synchronous dataflow graph, an SDF graph, the initial samples may be necessary to make a cycle in the SDF graph realizable.

Figure 1B:
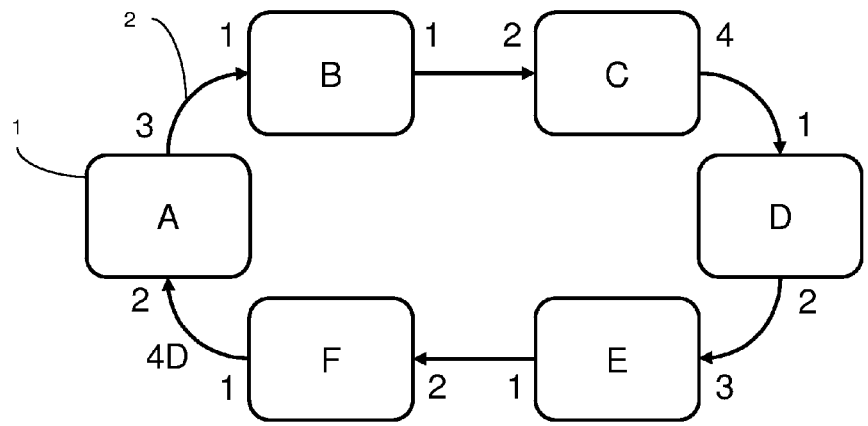
FIG. 1b shows an exemplary dataflow graph having vertices representing actors A through F and connected by connections.
Figure 2:
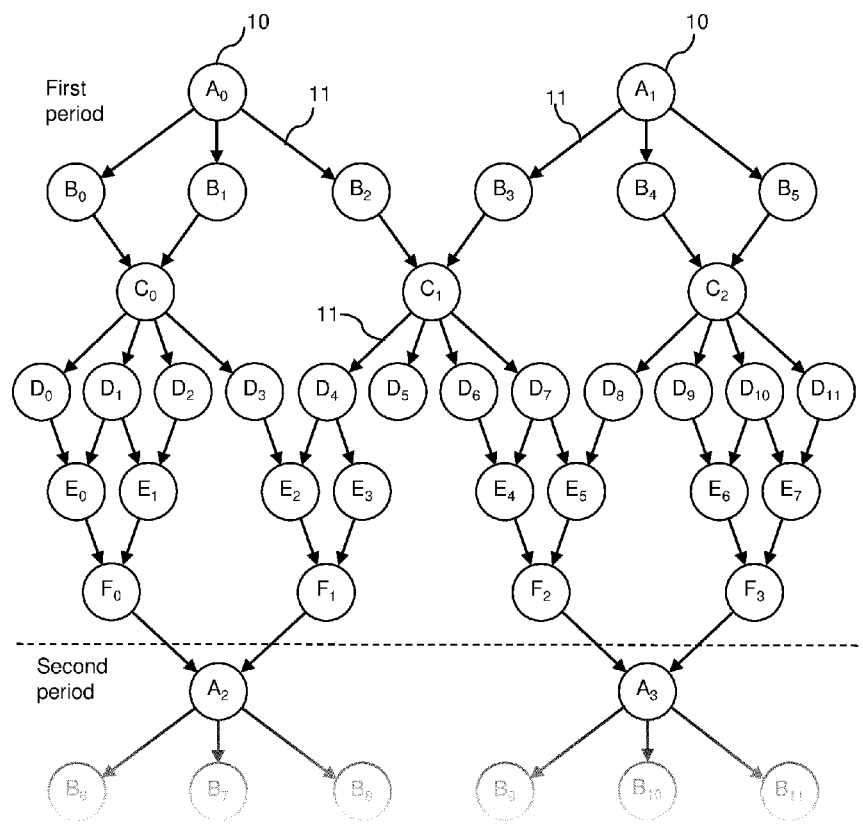
FIG. 2 shows a precedence graph corresponding to the dataflow graph in FIG. 1a, FIG. 3 shows the selection of the "first child" in a precedence graph corresponding to the dataflow graph in FIG. 1a, FIG. 4 shows the selection of the "last parent" in a precedence graph corresponding to the dataflow graph in FIG. 1a, FIG. 5 shows the parallelization of a serial program having a loop nest with four statements, A, B, C and D.

In FIG. 2, the precedence graph corresponding to the dataflow graph in FIG. 1b is shown. In the precedence graph, the vertices 10 are individual actor firings and the edges 11 represent the precedent constraints. An edge between two actors, such as between $A_0$ and $B_2$ is typically written as the edge ($A_0$, $B_2$). The first firing of an actor is the actor numbered zero, and the firings are thus numbered from zero. $A_0$ represents the first firing of actor A, $A_1$ the second firing of actor A and so on. The edge ($A_0$, $B_2$) represents the constraint that $A_0$ must execute before $B_2$ since $A_0$ produces the input of $B_2$. The production rate of A is 3, so for each firing of A, three outputs are provided. The consumption rate for B is 1, thus, one firing of $A_0$ produces input for $B_0$, $B_1$, and $B_2$. It is seen that the precedence graph in FIG. 2, corresponding to the dataflow graph in FIG. 1b, has 35 vertices, which is the number of firings or the schedule length, and 52 edges or precedence constraints per period. Thus, $A_0$ is the predecessor for $B_0$, $B_1$, and $B_2$.

Generally, the presence of an edge, ($A_j$, $B_k$), means that $B_k$ depends on $A_j$ or, stated differently, $B_k$ consumes a sample that is produced by $A_j$. Thus, $A_j$ is the predecessor for $B_k$ while $B_k$ is the successor for $A_j$.

In the exemplary embodiment where a consistent and live SDF graph has a periodic schedule, then the precedence graph may be partitioned accordingly. A particular periodic schedule is found by sorting one or any given number of periods topologically. The precedence graph is thus a representation of all possible periodic schedules.

Starting from FIG. 2, the task may be said to be how to find the first firing of actor B such that it depends on a given firing of A, say $A_0$, while considering only the dependence caused by production and consumption of samples on the connection (A, B). The first firing, that is the one with the minimum index, is clearly $B_0$. The other two candidates are $B_1$ and $B_2$, but they have higher indices.

Figure 3:
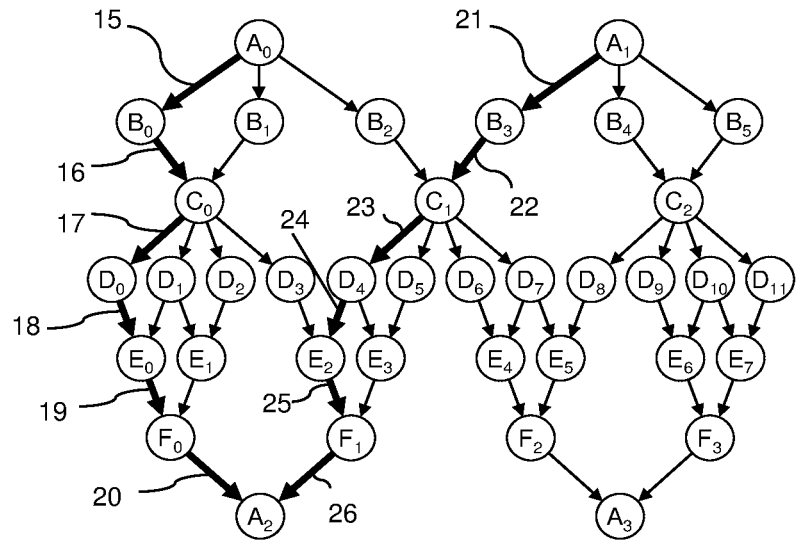

Now generalize the task to that of finding the first firing of any actor in a given path from A, such that they depend on $A_0$ for the path ABCDEFA. It is seen in FIG. 3, that the first firing of B that depends on $A_0$ is $B_0$. In each step the first firing of B, C, D, E, F and A, respectively, is selected and it is seen that $B_0$, $C_0$, $D_0$, $E_0$, $F_0$ and $A_2$, are the first firings of each actor, respectively, that depends on $A_0$. The path followed in the precedence graph starts at $A_0$ via edge 15 to $B_0$, via edge 16 to $C_0$, via edge 17 to $D_0$, via edge 18 to $E_0$, via edge 19 to $F_0$ and via edge 20 to actor $A_2$. It is seen that another child, or another successor, could have been selected in each step, however, this would not have led to firings with lower indices. The selection of the first firing may be expressed as a monotonic, non-decreasing function.

It is seen that the first firings of any actor so that they depend on $A_1$ may be found in the same way. Thus, the first firing of B that depends on $A_1$ is $B_3$. In each step, the first firing of B, C, D, E, F and A, respectively, is selected and it is seen that $B_3, C_1, D_4, E_2, F_1$ and $A_2$, are the first firings of each actor, respectively, that depends on $A_1$. The path followed in the precedence graph starts at $A_1$ via edge 21 to $B_3$, via edge 22 to $C_1$, via edge 23 to $D_4$, via edge 24 to $E_2$, via edge 25 to $F_1$ and via edge 26 to actor $A_2$. It is thus seen that the feedback distance along a given simple cycle may be determined by following the path to the first child or the first successor, i.e. the one with minimum index repeatedly. In this particular case the path from $A_1$ to $A_2$, results in the minimum distance between firings of A.

Figure 4:
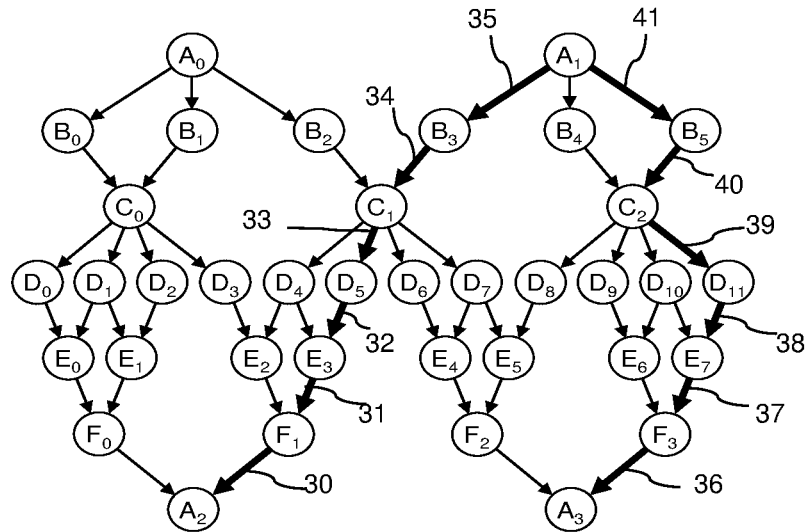

Alternatively, paths may be traversed in the opposite orientation of the edges, following the path to the last parent or the last predecessor, i.e. the one with maximum index. This is illustrated in FIG. 4, wherein the last predecessor as dependent on $A_2$ is found by following the path from $A_2$ to F, E, D, C, B, A. Thus, the last firing of F that depends on $A_2$ is $F_1$. In each step, the last firing of F, E, D, C, B and A, respectively, is selected and it is seen that $F_1, E_3, D_5, C_1, B_3$, and $A_1$, are the last firings of each actor, respectively, that depends on $A_1$. The path followed in the precedence graph starts at $A_2$ via edge 30 to $F_1$, via edge 31 to $E_3$, via edge 32 to $D_5$, via edge 33 to $C_1$, via edge 34 to $B_3$ and via edge 35 to actor $A_1$.

Also, starting from $A_3$ and finding the path to the last predecessor would give a same feedback distance. In each step, the last firing of F, E, D, C, B and A, respectively, is selected and it is seen that $F_3, E_7, D_{11}, C_2, B_5$, and $A_1$, are the last firings of each actor, respectively, that depends on $A_1$. The path followed in the precedence graph starts at $A_3$ via edge 36 to $F_3$, via edge 37 to $E_7$, via edge 38 to $D_{11}$, via edge 39 to $C_2$, via edge 40 to $B_5$ and via edge 41 to actor $A_3$.

It is thus seen that the feedback distance along a given simple cycle also may be determined by following the path to the last parent or the last successor, i.e. the one with maximum index repeatedly. In this particular case the path from $A_2$ to $A_1$, results in the feedback distance between firings of A. Also, the selection of the last firing may be expressed as a monotonic, non-decreasing function.

By considering all paths in the dataflow graph starting at A, the task is further generalized to that of finding the first firing of any actor, which is reachable from A such that it depends on a given firing of A. It turns out to be sufficient to consider only simple paths, i.e. paths in which each vertex appears at most once, with the exception of the first and last vertex of the path, which may be identical. In this case, they create a simple cycle. The dataflow graph of the example has only a single simple path between any pair of actors and ABCDEFA is the only simple cycle from A to A. We have thus already solved two instances of this problem, that is starting from $A_0$ and $A_1$ which are the only two firings of A in the first period.

Figure 5:
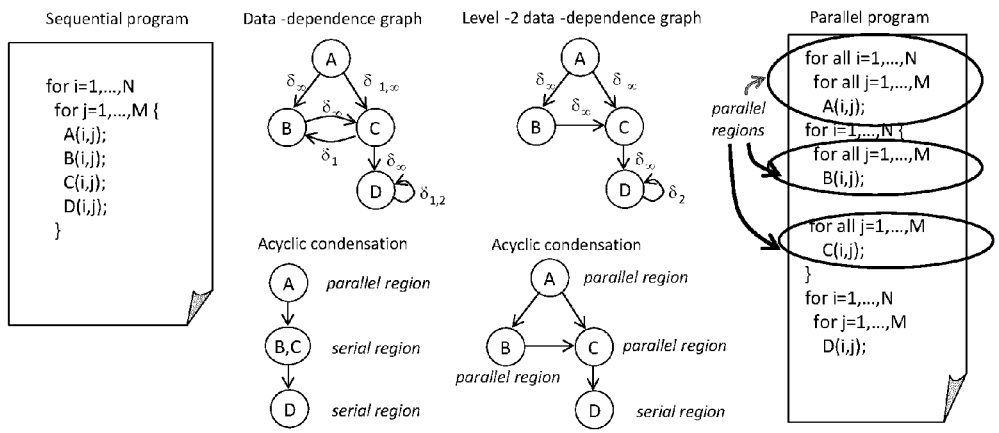

Typically, when using parallel computing, standard sequential programs have formed the starting point and a standard parallelization technique has typically been to form the acyclic condensation of the data dependence graph. Each strongly connected component in the data dependence graph may be referred to as a region, and further qualified as serial, or parallel. Parallel loops, in which all iteration may be executed concurrently, may be generated for the parallel regions. Each serial region may be executed within a "normal" serial loop executing on a single processor. In some cases, it may be possible to parallelize at least a part of the body of the serial loop. Such cases may be identified by forming the level 2 (level 3, 4, . . . ) data dependence graph, again forming the acyclic condensation and look for parallel regions, as seen in FIG. 5. In FIG. 5, a program is seen having a loop nest with four statements A,B,C and D. First the data-dependence graph may be constructed by analyzing the dependence between the statements. Edges that correspond to loop-carried dependence are labeled with $\delta_1$ (and/or $\delta_2$) if the outermost (inner) loop carries the dependence ($\delta_\infty$ if loop-independent). Next step is to form the acyclic condensation of the data-dependence graph, from which parallel and serial regions may be identified. By considering the k'th level of the data-dependence graph, which lacks dependence edges carried only by loops at levels 1, . . . , k−1, additional parallelism (within a serial region) may be detected. The resulting program may be seen to comprise "ordinary" serial loops and parallel "for all" loops, whose iterations may be executed concurrently. Generally, synchronization primitives known as barriers may be needed between the regions. The purpose of a barrier is to prevent execution of one region before the regions on which it depends, have been completed. The overhead caused by synchronization may be reduced by fusing the regions into larger entities, so that synchronization may not be required within the resulting, fused region.

Typically, when vectorization of a sequential program is performed, the goal of the vectorization is to transform scalar statements into vector statements, which execute multiple statement instances in parallel. Vectorization may be said to be similar to parallelization in that loops with independent iterations provide the source of parallelism. However, whereas it is generally beneficial to fuse loops when parallelizing a program, since this, as mentioned above, reduces the synchronization overhead, the opposite transformation, i.e. loop distribution, may be beneficial in vectorization: a vector statement may be generated when a loop nest may be distributed such that a single statement remains in the body and there is no loop-carried dependence. This process is illustrated in FIG. 6.

Figure 6:
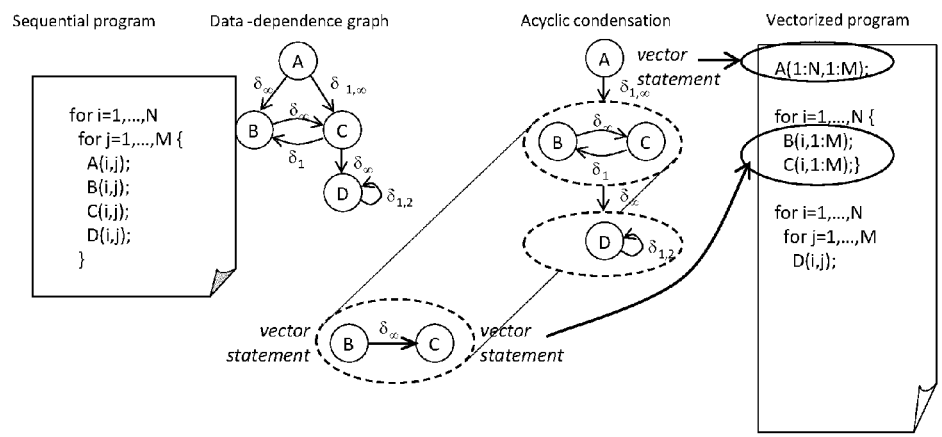
FIG. 6 shows vectorization of scalar statements, such as A(i, j), into vector statements, such as A(1:N, 1:M) which executes all of its N×M instances concurrently.

As seen in FIG. 6, the scalar statement A(i, j) is transformed into a vector statement, such as A(1:N, 1:M), which executes all of its N×M instances concurrently. In the same way as when parallelizing a sequential program the data-dependence graph may constructed and the acyclic condensation formed. Vector statements may generally be generated directly for trivial, acyclic components, such as single statements without self-loop, such as A in FIG. 6, whereas non-trivial components, such as {B, C}, and components with a self-loop, may require further decomposition of the dependence graph, again generally similar to parallelization. In this particular case, it may be possible to vectorize B and C, but not D.

Another difference between parallelization and vectorization arises when considering loop interchange by which two levels of a loop nest are interchanged. In the case of vectorization, it may be beneficial to interchange loops such that a possible dependence cycle is carried by the outermost loop. Vector statements may then be generated for the inner loops. When parallelizing a program, however, the outermost loop may be parallelized when it carries no dependence, which makes it beneficial to instead push dependence cycles to inner loops.

Figure 7:
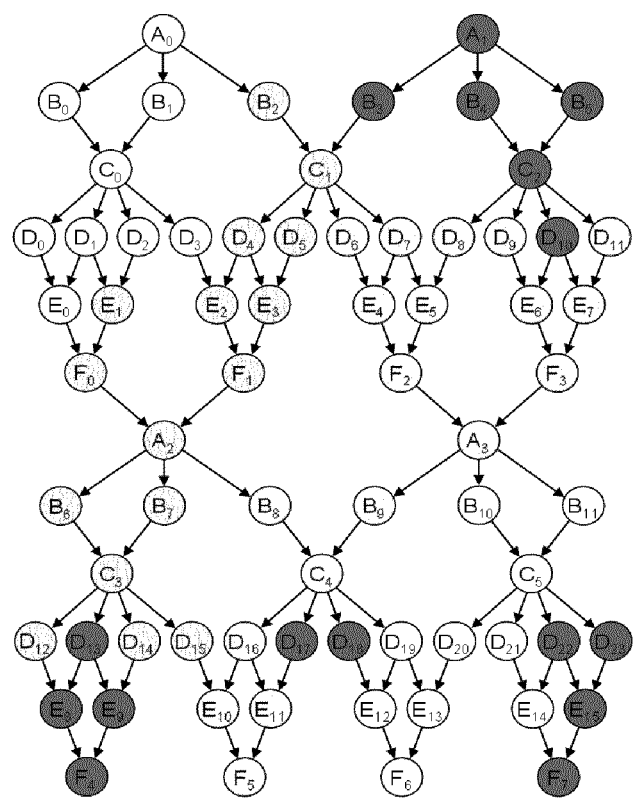
FIG. 7 shows a periodic, parallel schedule of a synchronous dataflow program and the static mapping onto a given number of processors.

Thus, for sequential programs, in order to find a fully static schedule for a multiprocessing computer system, the precedence graph need not only be topologically ordered, but each firing is also assigned to a specific processor. Depending on the number of available processors, the best or a sufficiently good schedule generally requires several periods to be considered as seen in FIG. 7. In FIG. 7, a periodic, parallel schedule of a synchronous dataflow program, known as PAPS is found by determining the precedence graph of the shortest periodic schedule, see FIG. 2, possibly duplicating it for any number of periods, two periods are shown in the FIG. 7, and mapping it statically to a given number of processors, shown by different shadings in the figure. The mapping is chosen such that some optimization criterion is met, such as the minimization of the make span, i.e. relating to the parallel execution time.

As discussed above, in the context of parallelization of sequential programs, the parallel schedule requires some synchronization mechanism.

In the example of FIG. 7, twelve firings of the actor D can be made without causing a cyclic dependence ($N_D=12$) whereas only two firings of A can be made at a time ($N_A=2$). Any actor, which is not part of any cycle in the dataflow graph (no such actor in the example), can be vectorized arbitrarily (any local blocking factor can be selected), but latency and storage requirements limit the range of practical choices.

Figure 8A:
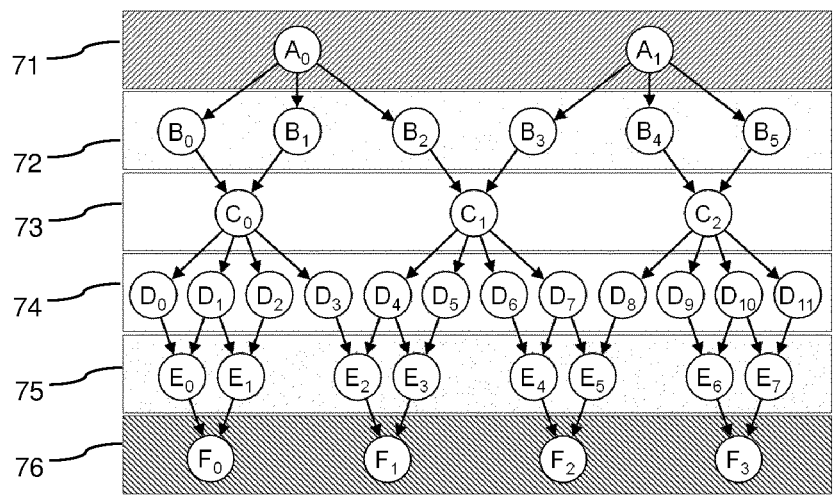
FIGS. 8a and 8b show tiles which consists of multiple firings of the same actor, and tiles which consists of different actors with instances representing mutually independent computations.
Figure 8B:
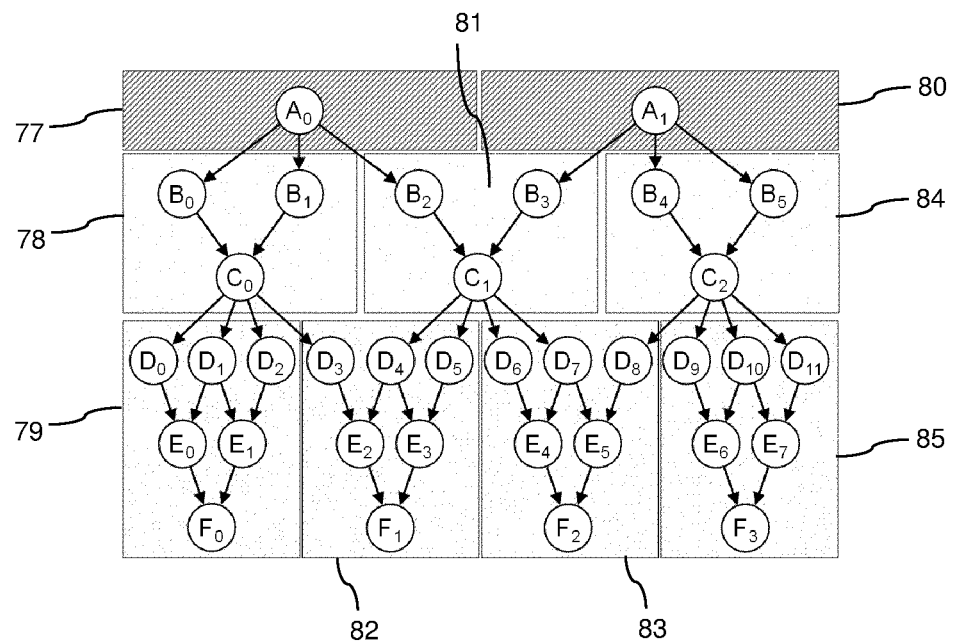

Looking again at dataflow programs and extraction of independent computations from a dataflow program using a method according to the present invention, a structure, which we call a "tile", is shown in FIGS. 8a and 8b.

A tile or region may be said to be a mapping, from an integer, n, to a set of actor firings and, in its simplest form, a tile represents a single actor firing, $\{A_n\}$.

Larger tiles may be composed by considering additional instances of the same tile, for instance $\{A_{100n}, A_{100n+1}, \ldots, A_{100n+99}\}$, such as tile or region 71 comprising two instances of an actor firing, $\{A_0, A_1\}$, region 72 comprising six instances of an actor firing $\{B_0, B_1, \ldots, B_5\}$, and likewise for region 73-76 as shown in FIG. 8a. These tiles may be referred to as sets of parallel regions.

Larger tiles or regions may also be formed or composed by forming the union of different tiles, for instance $\{A_n, B_{n+1}\}$, as seen in FIG. 8b. Some regions, 77, 81, represents only a single actor firing, such as $A_0$ or $A_1$, while other regions, composite regions, represent firings of distinct actors, such as a region representing the firing of $\{B_0, B_1, C_0\}$, 78, or the region 85 representing the firing of $\{D_9, D_{10}, D_{11}, E_6, E_7, F_3\}$. In both cases, the term component tile or component region may be used to denote the tiles or regions that were used to form the next-level, larger tile, which may be referred to as composite tiles or composite regions.

Another preferred class of tiles or regions may be those that induce a sequence of subgraphs, between which there is no path in the precedence graph, such as the subgraphs in FIG. 8b. The instances of such a tile or region represent mutually independent computations, which may be executed in parallel. When a tile contains firings of an actor being part of a cycle in the dataflow graph there is a limit as to how many instances may be composed without rendering the computations dependent. This may be referred to as the maximum parallelism of the tile. For example, the tile consisting of firings of the actors B and C may for instance be instantiated three times, whereas a fourth instance depends on the first and second ones.

Figure 9:
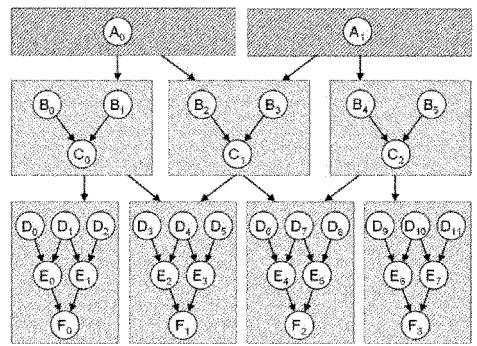
FIG. 9 shows a condensation of the precedence graph, in which tile instances treated as "larger grain" actor firings.

It may also be advantageous to refer to tile instances as "larger grain" actor firings. As is for example shown in FIG. 9, the precedence graph may be condensed by using the tile instances as vertices instead of the actor firings and only retain edges that span tile instances. A collection of tiles may serve as the basis of a schedule, in case the condensed precedence graph is acyclic.

Figure 10:
FIG. 10 shows the formation of four precedence graphs, a serial loop, a parallel loop, a sequence and a task graph.
Figure 10:
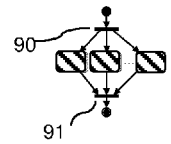
Figure 10:
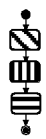
Figure 10:
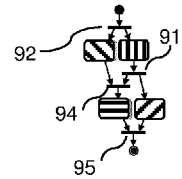

As is seen in FIG. 10, four different cases or kind of computations may result depending on the kind of regions, i.e. they may be serial or parallel and the kind of composition, i.e. there may be several instances of the same shape, or instances of different shapes. Thus, components of same shape and serial region forms a serial loop, and components of same shape and parallel region forms a parallel loop. Components of different shape and serial region form a sequence, whereas components of different shape and parallel region forms a task graph. In FIG. 10, synchronization points are indicated by horizontal bars in the figure.

Except for the case of serial regions that are aggregated into a larger serial region, synchronization is typically required between a pair of dependent regions: the second region in such a pair may not start executing before the first region has been completed (precedence constraints must be maintained). The points in the schedule that require synchronization are shown as horizontal bars 90, 91, 92, 93, 94, 95, in FIG. 10.

Figure 11:
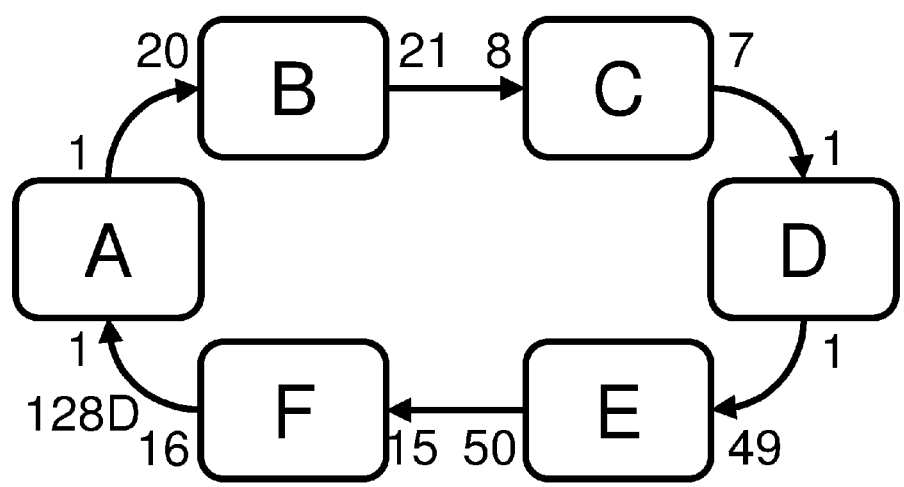
FIG. 11 shows a dataflow graph of an algorithm that involves multiple stages of sample-rate conversion.
Figure 12:
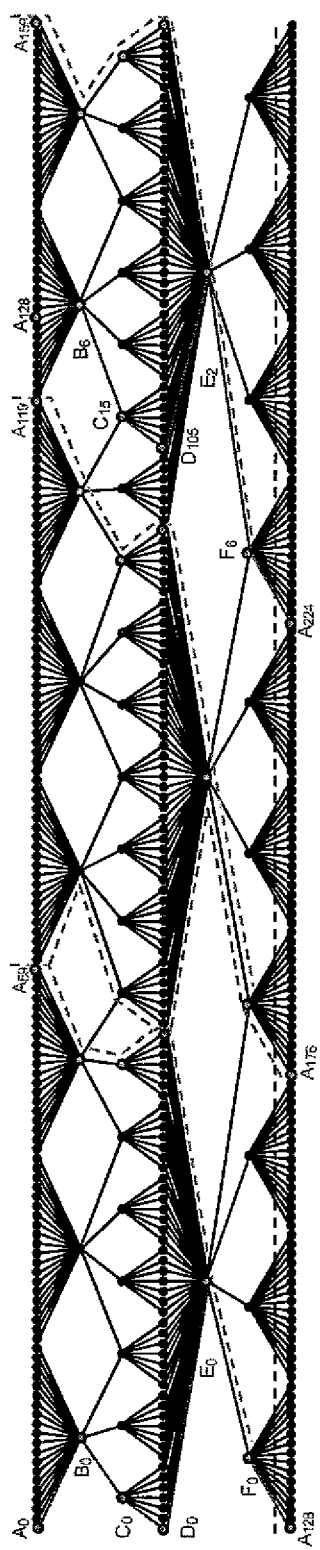
FIG. 12 shows the precedence graph corresponding to the dataflow graph in FIG. 11.

The benefit and advantages of the present invention modeling the precedence graph becomes even more clear when considering a dataflow graph, such as the dataflow graph in FIG. 11. In this dataflow graph, there are 128 initial samples and rates which are no multiples of each other, thus the precedence graph as seen in FIG. 12 is large and complex.

According to the present invention, rather than searching along all the paths that correspond to the 160 firings of A in a period, it is sufficient to follow two, $A_0$-$B_0$-$C_0$-$D_0$-$E_0$-$F_0$-$A_{128}$ and $A_{128}$-$B_6$-$C_{15}$-$D_{105}$-$E_2$-$F_6$-$A_{224}$. This is sufficient to identify tiles that cover one period, although it is possible to continue in the same manner to determine a larger collection of tiles that cover multiple periods. Having identified $A_{128}$ as the first firing that depends transitively on $A_0$, it is thus established that $\{A_0, \ldots, A_{127}\}$ are mutually independent as are $\{B_0, \ldots, B_5\}, \{C_0, \ldots, C_{14}\}, \{D_0, \ldots, D_{104}\}, \{E_0, E_1\}$ and $\{F_0, \ldots, F_5\}$. A second collection of tiles complete the period: $\{A_{128}, \ldots, A_{159}\}, \{B_6, \ldots, B_8\}, \{C_{15}, \ldots, C_{20}\}, \{D_{105}, \ldots, D_{146}\}, \{E_2\}$ and $\{F_6, \ldots, F_9\}$.

Thus, by following the path from $A_0$ to the first child repeatedly, $A_{128}$ is found to be the first firing of A that depends (transitively) on $A_0$ along the simple cycle ABCDEFA in the dataflow graph. This means that $\{C_0, \ldots, A_{127}\}$ are mutually independent. Similarly, $A_{224}$ is found to be the first firing that depends (transitively) on $A_{128}$. Following the edges in reverse orientation, to the last parent (the parent with the highest index) reveals that $A_{59}$ is the last firing of A, on which $A_{128}$ depends. Similarly, $A_{119}$ is the last firing of A, on which $A_{224}$ depends. In particular, this means that the all of the firings $\{A_0, \ldots, A_{59}\}$ are needed in order to fire $A_{128}$ and subsequent firings of A. It is seen that if a smaller subset of firings is scheduled progress beyond $A_{127}$ is not possible.

In some situations, however, it is beneficial to work with smaller tiles. As is shown in FIG. 12 Error! Reference source not found, it is possible to determine the smallest set of firings, which is required to make $A_{128}$ fireable; by following the dependence edges in reverse orientation from $A_{128}$; in each step selecting the last parent (the one with the highest index), i.e. following the path $A_{128}, F_0, E_0, D', B', A_{59}$. It is thus clear that the tile at least has to include $\{A_0, \ldots, A_{59}\}$ in order to make progress along the cycle in the dataflow graph.

In this way, it may be possible to establish a collection of smaller tiles, each of which has the property of making progress along the cycle. Following $\{A_0, \ldots, A_{59}\}$, the tile $\{A_{60}, \ldots, A_{119}\}$ may be identified by first identifying the first firing of A that depends on $A_{60}$, which is $A_{176}$, and then follow the edges in reverse to identify that firings up to and including $A_{119}$ are required to make progress beyond what $\{A_0, \ldots, A_{59}\}$ has already provided.

For some dataflow programs, decomposition of the dataflow graph into strongly connected components may be advantageously. The strongly connected components may typically be scheduled individually.

Figure 13A:
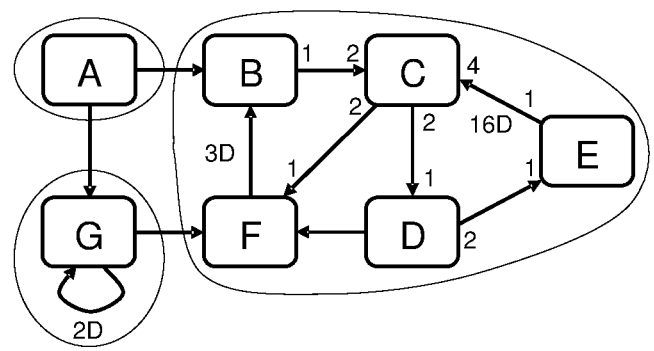
FIG. 13a shows decomposition of a dataflow graph into strongly connected components.

In FIG. 13a, a decomposition of a dataflow graph into strongly connected components, that is A, G and BCDEF, is shown.

In general, a dataflow graph may contain several cycles and also actors, which are not involved in any cycle. The latter case is simple; they cannot cause cyclic dependences and need not be considered by the schedulability or dependence test. However, to deal with multiple cycles, the dataflow graph may be decomposed into its strongly-connected components as shown in FIG. 13a.

Figure 13B:
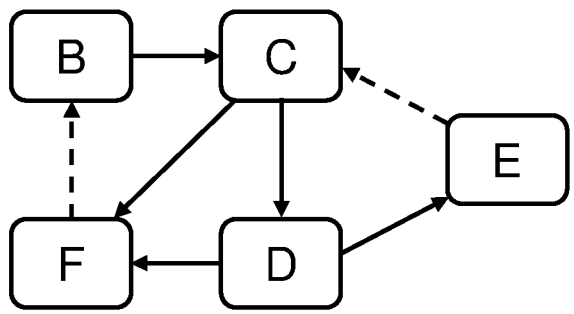
FIG. 13b shows decomposition of a strongly connected component into fundamental cycles.

The components, which may consist of several cyclically connected actors, may be said to be non-trivial and they may be further decomposed into sets of simple cycles. This may be achieved by removing a set of feedback edges such that an acyclic directed graph (DAG) results, such as seen in FIG. 13b. FIG. 13b shows the decomposition of BCDEF into fundamental cycles, and so called chords are shown as dashed arrows. The simple cycles may be combinations of the fundamental cycles, containing one or more chords in general. In the present example, BCDFB, BCDB and CDEC are the simple cycles.

Simple cycles may result by reinserting the feedback edges. The selection of feedback edges, which may be removed to make each component acyclic, is not critical. It may however be possible to only select feedback edges that correspond to connections with sufficient initial samples for the first firing of a consumer, otherwise there may be a cycle with insufficient initial samples and the dataflow graph may be not live. In this way, the sources of the DAG correspond to actors that can fire initially (using initial samples only).

The simple cycles that contain a given a feedback edge (u, v), may be identified by finding the paths in the DAG from v to u. The may be one or more path from v to u. For example, in FIG. 13b, it is seen that there are two paths from B to F, in the present case BCDF and BCF, which form simple cycles with the feedback edge (F, B).

Each simple cycle may have a period being significantly shorter than that of the schedule for the entire dataflow graph. This situation arises when the number of firings of each actor (as specified by the repetitions vector) within the simple cycle have a common divisor that is greater than one. The proposed schedulability or dependence test may take advantage hereof in that less firings in a period means that it might suffice to explore a lower number of paths to verify the absence of cyclic dependences.

After the decomposition into strongly connected components, and/or into simple cycles, the schedulability or dependence of each resulting cycle may be verified separately. Enumerating all simple cycles, however, potentially leads to an impractical algorithm, since the number of cycles may be exponential in the number of vertices (actors). Instead, all cycles that share a feedback edge are traversed simultaneously by a visiting the vertices of the DAG in reverse post order and summarizing multiple paths at vertices with multiple predecessors. In the case of the DAG in FIG. 13b, the cycles B-C-D-F and C-D-E are reverse post-orderings of the vertices that share the feedback edges: (F, B) and (E, C), respectively. A vertex, like F, which has multiple predecessors in the DAG summarizes multiple simple paths, by determining the first reachable firing, that is the firing with the minimum index.

In identifying mutually independent firings, we leverage on a specific form of tile, which we call an edge tile. An edge tile has the property of representing the precedence constraints that correspond to a single edge in the dataflow graph. An edge tile results in a recurring, periodic, dependence pattern: the subgraphs of the precedence graph, which are induced by several instances of an edge tile, have the "same shape" and an integral number of instances cover one period of the schedule as seen in FIGS. 14a and 14b.

The structure of an edge tile is completely determined by the properties of the connection, to which the edge corresponds: the production rate, the consumption rate and the number of initial samples ("delays").

The firings within a single instance of an edge tile are always dependent and thus either forms a serial region or a task graph that requires synchronization. Under certain conditions, however, multiple instances of an edge tile can execute in parallel. If the number of initial delays is a multiple of the greatest common divisor of the production and consumption rate, it is possible to align the firings of the two actors such that the instances of the edge tile are mutually independent (although still subject to transitive dependence along cycles, as discussed in the previous section). All of the edge tiles in FIG. 14a fall into this category. As is shown in FIG. 1b, (F, A) is the only edge with initial samples, four, which is divided by one, the greatest common divisor of the production rate (one) and the consumption rate (two). The fact that the edge tiles are mutually independent may be observed by the absence of a path between the subgraphs of the precedence graph, which are induced by the instances (see FIG. 14b). Another equivalent observation is that the connection between the actors may be drained before and after executing the set of firings of the edge tile.

Figure 14A:
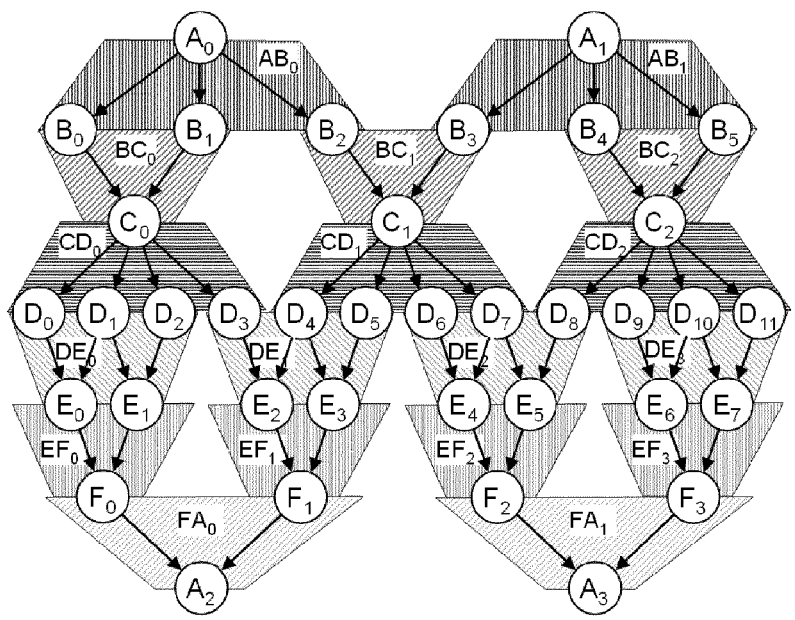
FIG. 14a shows one period of a precedence graph, covered with subgraphs induced from six edge tiles.
Figure 14B:
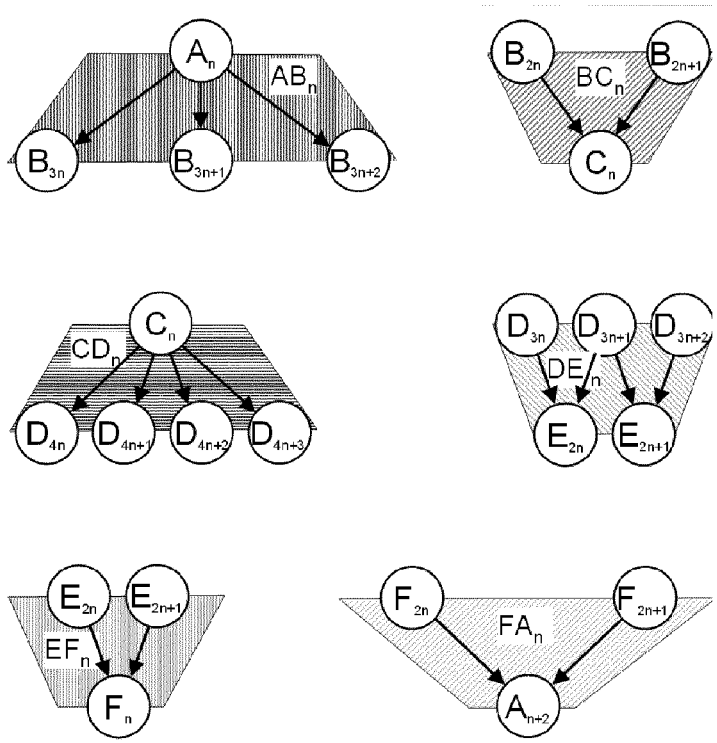
FIG. 14b shows the subgraphs induced by the six edge tiles as shown in FIG. 14a, FIG. 15a shows composition of edge tiles into component tiles.

In FIG. 14a, one period of a precedence graph, covered with subgraphs induced from six edge tiles is shown. The edge tile $AB_0$, is for example the first instance of the tile that corresponds to the edge (A, B). Note that each edge tile typically models a recurring dependence pattern and that an integral number of instances cover the precedence graph: two instances of $AB_n$ and $FA_n$, three instances of $BC_n$ and $CD_n$, and four instances of $DE_n$ and $EF_n$. Generalizing as seen in FIG. 14b, the subgraphs may be induced by the six edge tiles; $AB_n$, shown at the top left, is for example instance n of the tile that corresponds to the edge (A, B) of the dataflow graph, it consists of the vertices (actor firings) $A_n$, $B_{3n}$, $B_{3n+1}$ and $B_{3n+2}$ of the precedence graph.

If the number of initial samples is not divided by the greatest common divisor of the rates, an edge between the induced subgraphs is unavoidable. Such an edge indicates that the tiles represent dependent computations which must execute serially and the dependence is due to remaining samples on the connection and it is thus not possible to drain the connection.

Figure 15A:
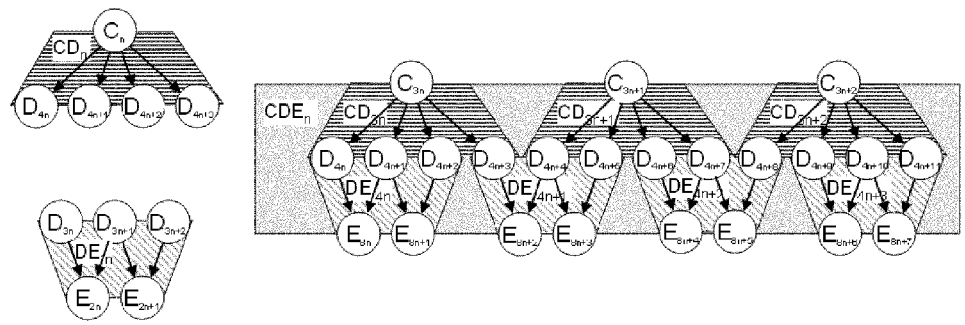
FIG. 15b shows another example composition of edge tiles into component tiles.
Figure 15B:
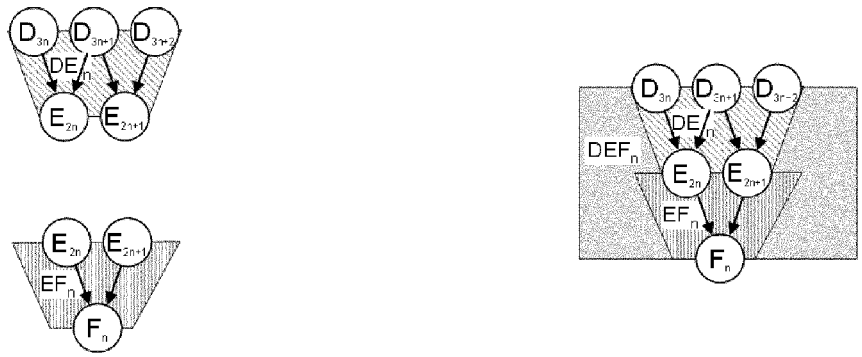

The edge tiles, which represent precedence over single edges in the dataflow graph, are composed into tiles that represent simple paths. The choice of component edge tiles greatly affects the properties of the composed tile. Also in this case, it may or may not be possible to align edge tiles such that the instances of the composed tile are mutually independent. All tiles in FIG. 14b may be aligned, but the number of parallel instances varies. Composing the edge tiles $CD_n$ and $DE_n$, which correspond to the edges (C, D) and (D, E), respectively, results in a tile that contains one period worth of firings of the actors C, D, E and the cycle in the dataflow graph limits the number of mutually independent instances to one, thus serial execution, as seen in FIG. 15a. Composing $DE_n$ and $EF_n$ on the other hand, results in a tile of which four instances can execute in parallel as seen in FIG. 15b.

In general, there is a trade-off between the synchronization overhead and the parallelism that is exposed by different compositions of edge tiles.

In one exemplary embodiment of the present invention, the dataflow graph in FIG. 1b is used as input and in a first step, the repetitions vector is determined using known techniques and verifies that the dataflow graph is live, again using known techniques or the technique proposed herein.

| Actor            | A | B | C | D  | E | F |
|------------------|---|---|---|----|---|---|
| Number of firings| 2 | 6 | 3 | 12 | 8 | 4 |

Step 2 comprises to decompose the dataflow graph into strongly connected components, wherein all actors are in the same SCC and find at least a partial schedule for the SCC.

Two ways of forming parallel regions are proposed: (1) by executing multiple firings of a single actor in parallel and (2) by executing instances of regions ("tiles") consisting of multiple actors.

In the first case, parallelism is limited by feedback: dependence along cycles in the dataflow graph.

By following the path via minimum-index successors ("first child") in the precedence graph using the formula presented in section 4.3.6: $A_0$-$B_0$-$C_0$-$D_0$-$E_0$-$F_0$-$A_2$ we establish that $A_2$ is the first firing of A that depends on $A_0$, which implies that $A_0$ and $A_1$ are mutually independent (can execute in parallel). As is described above this provides the following set of "tiles" that signify parallel regions: $\{A_{2n}, A_{2n+1}\}$, $\{B_{6n}, \ldots, B_{6n+5}\}$, $\{C_{3n}, \ldots, C_{3n+2}\}$, $\{D_{12n}, \ldots, D_{12n+11}\}$, $\{E_{8n}, \ldots, E_{8n+7}\}$ and $\{F_{4n}, \ldots, F_{4n+3}\}$.

Synchronization (e.g. a "barrier") is needed after each parallel region. There will thus be seven synchronization points, which will jointly be hit by every actor firing; thus 35 times per period.

If the work that is performed by each actor firing is small in relation to the synchronization overhead, the schedule/parallel program is inefficient. Alternate solutions are generated by forming tiles/parallel regions consisting of firings that belong to multiple actors: parallelism is traded for reduced synchronization overhead.

Following the heuristics of the embodiment, tiles are composed such that the remaining number of mutually independent instances is maximized. Initially, we have the following options (c.f. FIG. 14a):

| Tile      | $AB_n$ | $BC_n$ | $CD_n$ | $DE_n$ | $EF_n$ | $FA_n$ |
|-----------|--------|--------|--------|--------|--------|--------|
| Instances | 2      | 3      | 3      | 4      | 4      | 2      |

Composing the tiles of D and E results in the tile $DE_n=\{D_{3n}, D_{3n+1}, D_{3n+2}, E_{2n}, E_{2n+1}\}$, which can be instantiated four times without rendering the tiles dependent (due to feedback). At the expense of reducing the exposed parallelism, the synchronization point between D and E is removed.

Further composition with C (into $CDE_n$) would result in a tile that exposes no parallelism (only a single instance possible, see FIG. 15a). Further composition with F, however, results in $DEF_n=\{D_{3n}, D_{3n+1}, D_{3n+2}, E_{2n}, E_{2n+1}, F_n\}$, which can be instantiated four times. Remaining opportunities for composition are:

|           | Tile   |        |          |          |
|-----------|--------|--------|----------|----------|
|           | $AB_n$ | $BC_n$ | $CDEF_n$ | $DEFA_n$ |
| Instances | 2      | 3      | 1        | 2        |

Following the heuristic we compose $BC_n=\{B_{2n}, B_{2n+1}, C_n\}$, which can be instantiated three times forming a parallel region.

At some point, no further composition is possible without going below the prescribed parallelism (part of the proposed heuristics) and the composition ends. The (partial) schedule is formed by treating the regions as "larger grain" actors (see FIG. 6):

The parallel region (loop) $\{A_{2n}, A_{2n+1}\}$,
The parallel region (loop) composed of $BC_{3n}$, $BC_{3n+1}$, $BC_{3n+2}$,
The parallel region (loop) composed of $DEF_{4n}$, $DEF_{4n+1}$, $DEF_{4n+2}$ and $DEF_{4n+3}$.

We thus have a solution with three synchronization points with barriers that are jointly hit nine times per period (we started out with a more fine-granular schedule with seven synchronization points, hit 35 times per period).

Step 3: Combines the partial schedules of the SCCs, thus operating on the acyclic condensation of the dataflow graph. There is just a single SCC in this example, so we are already done.

In another exemplary embodiment, the repetition vector is found below:

Step 1, repetitions vector:

| Actor             | A   | B | C  | D   | E | F  |
|-------------------|-----|---|----|-----|---|----|
| Number of firings | 160 | 8 | 21 | 147 | 3 | 10 |

Step 2: Again all actors belong to the same SCC.
Minimum-index path: $A_0$-$B_0$-$C_0$-$D_0$-$E_0$-$F_0$-$A_{128}$ First period is still incomplete, so we continue: $A_{128}$-$B_6$-$C_{15}$-$D_{105}$-$E_2$-$F_6$-$A_{224}$ Unlike in the example I above, two "slices" are needed to cover a minimal periodic schedule. The following collection of "tiles" is the starting point:

$\{A_{160n}, \ldots, A_{160n+127}\}$, $\{B_{8n}, \ldots, B_{8n+5}\}$, $\{C_{21n}, \ldots, C_{21n+14}\}$, $\{D_{147n}, \ldots, D_{147n+104}\}$, $\{E_{3n}, E_{3n+1}\}$, $\{F_{10n}, \ldots, F_{10n+5}\}$ and $\{A_{160n+128}, \ldots, A_{160n+159}\}$, $\{B_{8n+6}, \ldots, B_{8n+7}\}$, $\{C_{21n+15}, \ldots, C_{21n+20}\}$, $\{D_{147n+105}, \ldots, D_{147n+146}\}$, $\{E_{3n+2}\}$, $\{F_{10n+6}, \ldots, F_{10n+9}\}$.

This provides the following options for composition

| Tile                  | $AB_n$ | $BC_n$ | $CD_n$ | $DE_n$ | $EF_n$ | $FA_n$ |
|-----------------------|--------|--------|--------|--------|--------|--------|
| Instances (slice 1)   | 6      | 1      | 14     | 2      | 1      | 6      |
| Instances (slice 2)   | 2      | 1      | 7      | 1      | 1      | 4      |

The slices are serialized due to dependence and are handled separately. In both cases, however, the composition of $CD_n$ is selected since this choice allows for the highest number of parallel instances.

Figure 16:
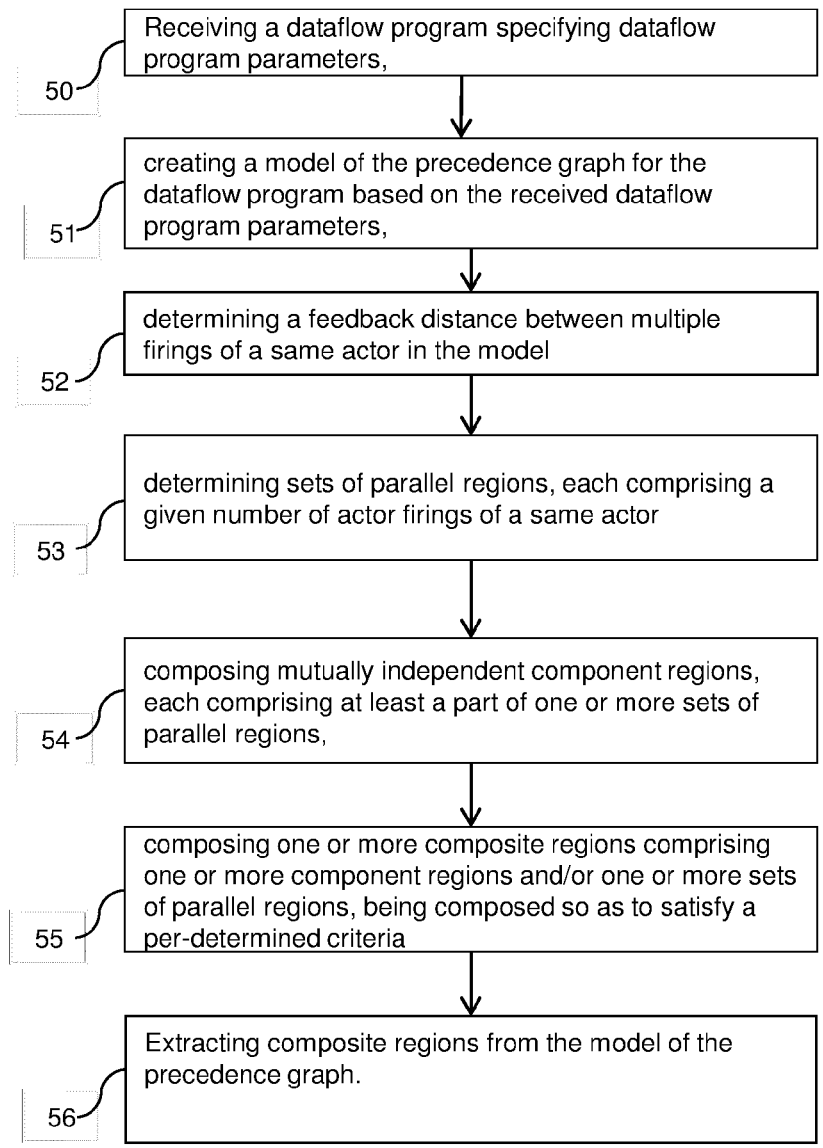
FIG. 16 shows a flow chart describing a method according to the present invention.

In FIG. 16, a flow chart describing a method of statically testing dependence in a dataflow program according to the present invention is shown. In step 50, a dataflow program is received specifying dataflow program parameters. The dataflow program may comprise a number of actors and a multiplicity of connections connecting the actors, and the dataflow program parameters may include specified consumption rates and specified production rates on the multiplicity of connections and a specified number of initial samples (delays) on at least a part of the multiplicity of connections, the initial samples providing input for a first set of actors. In step 51, a model, or at least one model, of the precedence graph for the dataflow program based on the received dataflow program parameters is created.

The model may thus be generated from the specified consumption rates, the specified production rates, and the number of initial samples. The at least one model of the precedence graph for the dataflow program may thus represent dependence constraints between distinct firings of the number of actors, and the precedence graph model may have a number of vertices, having associated therewith an actor-index pair, and edges representing precedent constraints, the vertices being ordered according to the precedent constraints so that all vertices, or substantially all vertices, has a set of successor/predecessor vertices. In step 52, a feedback distance between multiple firings of a same in the model is determined.

In step 53, sets of parallel regions, each comprising a given number of actor firings of a same actor, are determined. It is envisaged that a set may be an empty set, or a set may comprise one or more parallel regions. Hereafter, mutually independent component regions, are composed each comprising at least a part of one or more sets of parallel regions, as seen in step 54, and one or more composite regions comprising one or more component regions and/or one or more sets of parallel regions, are composed in step 55, so as to satisfy a perdetermined criteria. In step 56 the composite regions are extracted from the model of the precedence graph. The composite regions identified and extracted by this method may then preferable be used for scheduling a dataflow program onto a multitude of processors or processing units.

Figure 17:
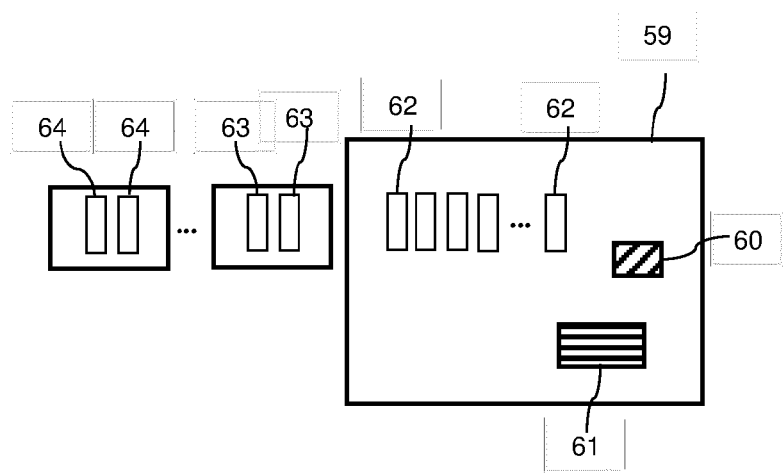
FIG. 17 shows a system configured to performing the present invention.

FIG. 17 shows a system on which a method according to the present invention may be performed. The system 59 may be a computer system configured to perform the present invention. In a preferred embodiment, the computer system 59 comprises a processor 61 for receiving the dataflow program, and for creating a model of the precedence graph for the received dataflow program. The model of the precedence graph may be stored in a storage 60. In a preferred embodiment, the processor forms part of a compiler, such as a compiler for statically testing, mapping and/or ordering of the dataflow program. The computer system may further comprise one or more processing units 62, 63, 64 for performing the computations of the dataflow program, either in parallel or sequential. The processing units may form part of the computer system, or they may form separate parts. It is envisaged, that the present method may be performed statically using a compiler and outputting the dependence. Thus, a system configured to perform the present invention may comprise only a compiler having a storage.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

Definition of terms and abbreviations which may be used in the present description:

CPU Central processing unit

Actor A component of a dataflow program, the actor implements a computation that is part of a dataflow program.

Actor firing An execution step of an actor.

Connection A connection between two actors in a dataflow graph. The connection specifies flow of data.

Producer The source of a connection, the actor that writes data onto the connection, the producer having a production rate.

Consumer The terminus of a connection, the actor that reads data from the connection, the consumer having a consumption rate.

Dataflow graph The graph representation of a dataflow program: actors are connected by connections.

Scheduling Scheduling of a dataflow program is the tasks of mapping computations onto CPUs and ordering them on each CPU. Each of the subtasks, mapping and ordering, may be made statically, in which case decisions are made at compile-time, or dynamically, in which case the decisions are made at run-time.

SDF Synchronous dataflow, a restricted form of dataflow, which may be scheduled statically.

Repetitions vector The repetitions vector may specify the number of firings of each actor in a minimal periodic schedule.

Precedence graph The graph representation of the dependence relation, which in the context of the present invention has actor firings as vertices. Edges represent precedence constraints, such that a first actor firing must precede a second actor firing in a schedule of the dataflow program.

Topological ordering A linear ordering of the vertices of a graph, e.g. the actor firings of the precedence graph, such that for each edge (u, v) in the graph, u appears before v in the ordering.

Schedulability (of an SDF graph) A synchronous dataflow graph is schedulable if a repetitions vector may be determined and the precedence graph is acyclic.

Feedback distance Denotes the minimal number of firings, d, such that one firing, $A_{j+d}$, of an actor A depends on another firing, $A_j$ of the same actor. In particular, the precedence graph may be acyclic if and only if d is positive for all actors, A.

Simple path A path (in a graph), in which each vertex appears at most once with the exception of the first and last vertices of the path which may be identical.

Dependence relation The edges of the precedence graph (a set of pairs of actor firings, in the context of this invention).

Strongly connected A directed graph may be strongly connected, if there is a path from each vertex of the graph to every other vertex.

SCC Strongly connected component, a maximal strongly connected subgraph of a directed graph.

The invention claimed is:

1. A computer-implemented method of identifying and extracting mutually independent computations in a dataflow program for exploiting massive parallelism, the method comprising:

receiving a dataflow program having a number of actors and a multiplicity of connections connecting the actors, the dataflow program providing:
specified consumption rates on the multiplicity of connections;
specified production rates on the multiplicity of connections;
a specified number of initial samples on at least a part of the multiplicity of connections, the initial samples providing input for a first set of actors;

generating, from the specified consumption rates, the specified production rates, and the specified number of initial samples, at least one model of a precedence graph for the dataflow program, the model:
representing dependence constraints between distinct firings of the number of actors;
having a number of vertices, having associated therewith an actor-index pair;

having edges representing precedent constraints; for the at least one model:
  determining a feedback distance between multiple firings of a same actor in the model;
  determining sets of parallel regions for at least a part of the vertices of the model, such that each set of parallel regions comprises a given number of actor firings of a same actor, the given number being dependent on the determined feedback distance;
  composing mutually independent component regions, each component region comprising at least a part of one or more sets of parallel regions;
  composing one or more composite regions so as to satisfy a predetermined criteria; the one or more composite regions comprising at least one of:
    one or more component regions; and
    one or more sets of parallel regions;
  extracting composite regions from the model.

2. The method of claim 1, wherein the precedence graph for the dataflow program is schedulable.

3. The method of claim 1, wherein at least one composite region comprises one or more sets of parallel regions and is a serial region.

4. The method of claim 1, wherein one or more of the composite regions comprises at least one of:
  multiple firings of a single actor; and
  firings of multiple actors.

5. The method of claim 1, wherein:
  the dataflow program is decomposed into strongly connected components;
  mutually independent computations are at least one of:
    identified separately for one or more strongly connected components; and
    extracted separately for one or more strongly connected components.

6. The method of claim 5, further comprising scheduling the mutually independent computations onto parallel executing processors.

7. The method of claim 1, wherein the predetermined criteria comprises obtaining a highest number of remaining parallel regions.

8. The method of claim 1, wherein the predetermined criteria comprises obtaining a predetermined efficiency.

9. The method of claim 1, further comprising testing if the set of composite regions provides an efficient set of composite regions.

10. The method of claim 1, wherein multiple instances of a component region can execute in parallel, the component region being composed for sets of actors wherein a number of initial samples is a multiple of a greatest common divisor of the specified consumption rates and the specified production rates.

11. The method of claim 1, wherein, for a first producing actor having a first production rate and a first consuming actor having a first consumption rate, with a first number of firings of the first producing actor and a second number of firings of the first consuming actor:
  a cumulative first production rate is the first production rate times the first number of firings;
  a first cumulative consumption rate is the first consumption rate time the second number of firings;
  wherein a balance value on a connection, between the first producing actor and the first consuming actor, is a sum of the number of initial samples and the cumulative first production rate minus the cumulative consumption rate.

12. The method of claim 11, wherein a sum of balance values on all connections in a composite region is zero.

13. A computer program product stored in a non-transitory computer readable medium for identifying and extracting mutually independent computations in a dataflow program for exploiting massive parallelism, the computer program product comprising software instructions which, when run on a computer, causes the computer to:
  receive a dataflow program having a number of actors and a multiplicity of connections connecting the actors, the dataflow program providing:
    specified consumption rates on the multiplicity of connections;
    specified production rates on the multiplicity of connections;
    a specified number of initial samples on at least a part of the multiplicity of connections, the initial samples providing input for a first set of actors;
  generate, from the specified consumption rates, the specified production rates, and the specified number of initial samples, at least one model of a precedence graph for the dataflow program, the model:
    representing dependence constraints between distinct firings of the number of actors;
    having a number of vertices, having associated therewith an actor-index pair;
    having edges representing precedent constraints;
  for the at least one model:
    determine a feedback distance between multiple firings of a same actor in the model;
    determine sets of parallel regions for at least a part of the vertices of the model, such that each set of parallel regions comprises a given number of actor firings of a same actor, the given number being dependent on the determined feedback distance;
    compose mutually independent component regions, each component region comprising at least a part of one or more sets of parallel regions;
    compose one or more composite regions so as to satisfy a predetermined criteria, the one or more composite regions comprising at least one of:
      one or more component regions; and
      one or more sets of parallel regions;
    extract composite regions from the model.

14. A computing device for configuring a multitude of data processors to perform a process, the computing device comprising:
  one or more processing circuits configured to:
    receive a dataflow program having a number of actors and a multiplicity of connections connecting the actors, the dataflow program providing:
      specified consumption rates on the multiplicity of connections;
      specified production rates on the multiplicity of connections;
      a specified number of initial samples on at least a part of the multiplicity of connections, the initial samples providing input for a first set of actors;
    generate, from the specified consumption rates, the specified production rates, and the specified number of initial samples, at least one model of a precedence graph for the dataflow program, the model:
      representing dependence constraints between distinct firings of the number of actors;
      having a number of vertices, having associated therewith an actor-index pair;
      having edges representing precedent constraints;

for the at least one model of the precedence graph:
  determine a feedback distance between multiple firings of a same actor in the model;
  determine sets of parallel regions for at least a part of the number of vertices of the model, such that each set of parallel regions comprises a given number of actor firings of a same actor, the given number being dependent on the determined feedback distance;
  compose mutually independent component regions, each component region comprising at least a part of one or more sets of parallel regions;
  compose one or more composite regions so as to satisfy a predetermined criteria, the one or more composite regions comprising:
    one or more component regions; and
    one or more sets of parallel regions;
  extract extracting composite regions from the model for performing the process and scheduling the identified and extracted mutually independent computations in the dataflow program onto the multitude of data processors;
a physical storage communicatively coupled to the one or more processing circuits, the physical storage configured to store the at least one model of the precedence graph.

* * * * *